US012717717B2

(12) United States Patent
Diamand et al.

(10) Patent No.: US 12,717,717 B2
(45) Date of Patent: Aug. 25, 2026

(54) INTEGRATED CIRCUIT CHIP TO SELECTIVELY PROVIDE TAG ARRAY FUNCTIONALITY OR CACHE ARRAY FUNCTIONALITY

(71) Applicant: Intel Corporation, Santa Clara, CA (US)

(72) Inventors: Israel Diamand, Aderet (IL); Julius Mandelblat, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/083,389

(22) Filed: Dec. 16, 2022

(65) Prior Publication Data

US 2024/0202120 A1 Jun. 20, 2024

(51) Int. Cl.

| | |
|---|---|
| ***G06F 12/00*** | (2006.01) |
| ***G06F 3/06*** | (2006.01) |
| ***G06F 12/0806*** | (2016.01) |
| ***G06F 12/0811*** | (2016.01) |
| ***G06F 12/0846*** | (2016.01) |
| ***G06F 12/0864*** | (2016.01) |
| ***G06F 12/0895*** | (2016.01) |
| *G06F 1/3225* | (2019.01) |
| *G06F 1/3234* | (2019.01) |

(52) U.S. Cl.

CPC ........ *G06F 12/0806* (2013.01); *G06F 3/0634* (2013.01); *G06F 12/0811* (2013.01); *G06F 12/0846* (2013.01); *G06F 12/0864* (2013.01); *G06F 12/0895* (2013.01); *G06F 1/3225* (2013.01); *G06F 1/3275* (2013.01); *G06F 2212/1016* (2013.01); *G06F 2212/1028* (2013.01); *G06F 2212/502* (2013.01); *G06F 2212/601* (2013.01)

(58) Field of Classification Search

None

See application file for complete search history.

(56) References Cited

U.S. PATENT DOCUMENTS

| | | | |
|---|---|---|---|
| 5,479,641 A | 12/1995 | Nadir et al. | |
| 6,092,159 A | 7/2000 | Ekner et al. | |
| 6,209,072 B1 | 3/2001 | MacWilliams et al. | |
| 6,789,172 B2 * | 9/2004 | Chauvel .............. | G06F 12/0835 710/22 |

(Continued)

*Primary Examiner* — Midys Rojas

(74) *Attorney, Agent, or Firm* — Essential Patents Group, LLP

(57) ABSTRACT

Techniques and mechanisms for selectively configuring an integrated circuit (IC) chip to provide tag array functionality and/or cache array functionality. In an embodiment, an IC chip comprises a first array of memory cells, a second array of memory cells, and a cache controller. Based on whether the IC chip is coupled to another IC chip, selector circuitry of the IC chip configures one of multiple possible modes of the cache controller. A first mode of the multiple modes is to provide tag array functionality with the first array, and cache array functionality with the second memory cell array. A second mode of the multiple modes is to provide tag array functionality with the second memory cell array, and cache array functionality with a remote array of memory cells. In another embodiment, the cache controller is reconfigured to another mode based on a change to a power consumption characteristic.

20 Claims, 11 Drawing Sheets

(56) References Cited

U.S. PATENT DOCUMENTS

| | | | |
|---|---|---|---|
| 6,836,826 | B2 | 12/2004 | Sharma |
| 8,464,000 | B2 | 6/2013 | Ingle et al. |
| 10,176,099 | B2 | 1/2019 | Gaur et al. |
| 10,795,823 | B2 | 10/2020 | Ramanujan et al. |
| 2017/0249250 | A1 | 8/2017 | Ramanujan et al. |
| 2018/0336143 | A1* | 11/2018 | Lai ...................... G06F 12/0808 |

* cited by examiner

IC die 570

IC die 301

Core(s) 310

572

302

349

Coherency agent 322

Memory subsystem 320

Array 330

Array 332

Array 574

341

345

347

Detector 324

Cache controller 340

Selector 326

Core(s) 576

Memory controller 350

328

304

562

DDR memory 560

505

Tag (and state)

Data cache

FIG. 9A
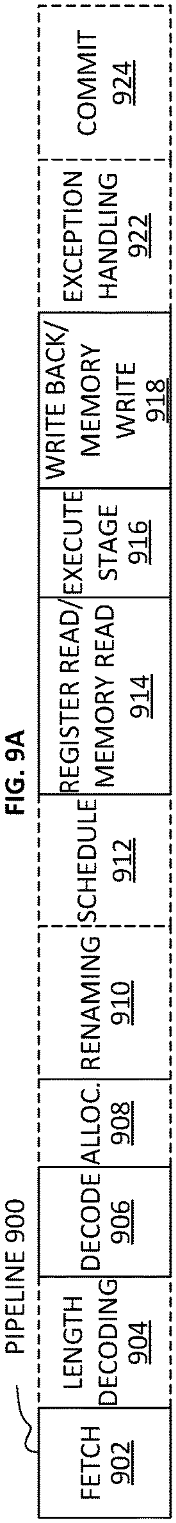
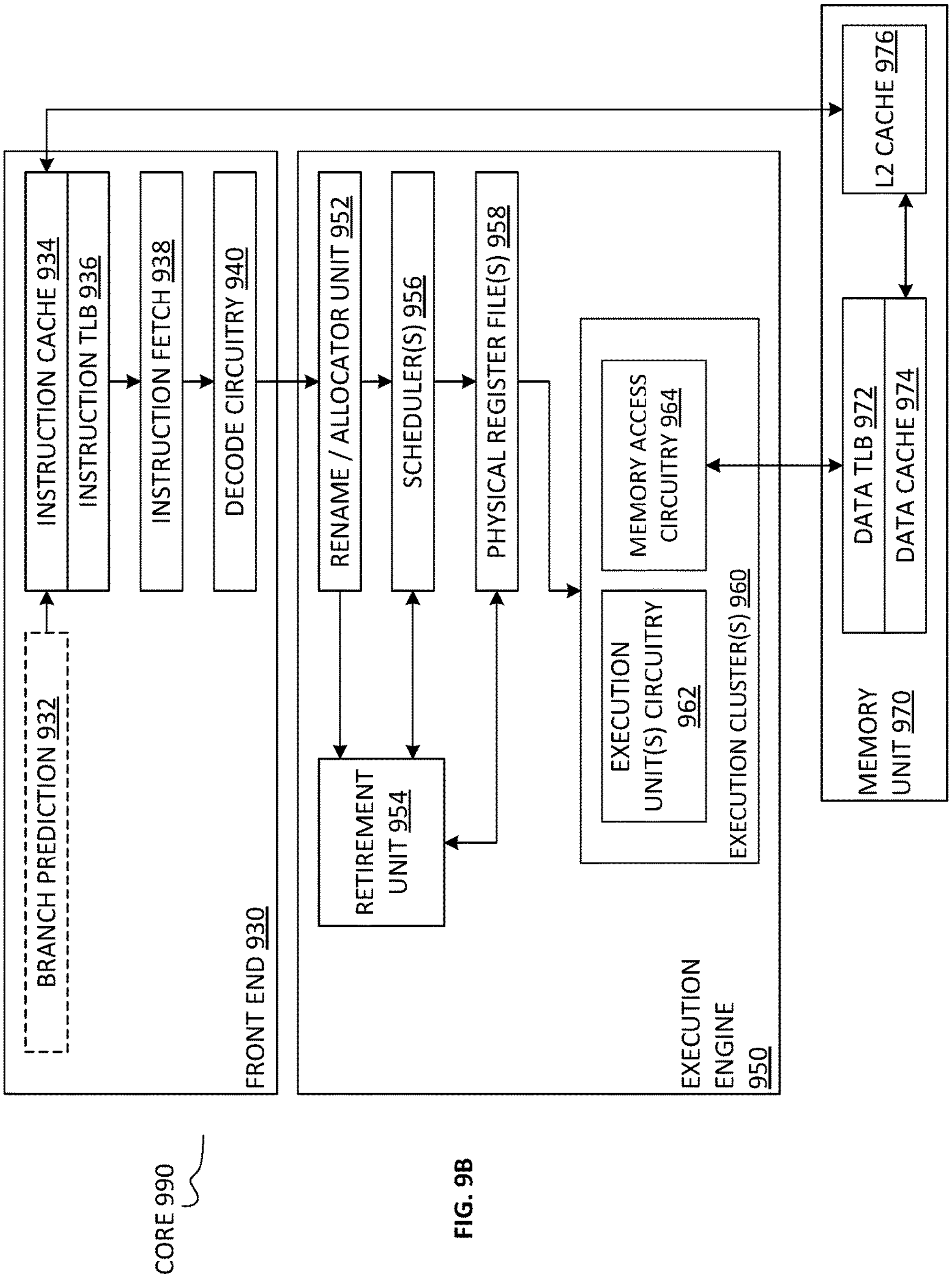
FIG. 9B

INTEGRATED CIRCUIT CHIP TO SELECTIVELY PROVIDE TAG ARRAY FUNCTIONALITY OR CACHE ARRAY FUNCTIONALITY

BACKGROUND

1. Technical Field

This disclosure generally relates to cache systems and more particularly, but not exclusively, to selectively providing tag array functionality or cache array functionality with an integrated circuit die.

2. Background Art

Many computer systems use multiple levels of caches to cache data to and from a memory device. For example, such a computer system usually has a level one cache (L1) and a larger level two cache (L2), in addition to an even larger RAM memory. The L1 cache typically contains a copy of information that was previously loaded from RAM by the processor, and the L2 cache typically contains both a copy of information in the L1 cache and other information that had been loaded from RAM by the processor less recently than the information in the L1 cache.

Caches in such computer systems usually comprise a data array, which stores information copied from the memory, and a tag array, which stores a directory of the information that is contained in the corresponding data array. In an instance of the above example, one such system has an L1 data array, an L1 tag array that contains a directory of information in the L1 data array, an L2 data array, and an L2 tag array that contains a directory of information in the L2 data array.

When the processor in the example system described above issues a memory load request, this request is broadcast to the L1 cache system, including the L1 tag array, and L1 data array. The L1 tag array is examined to determine if the requested information is in the L1 data array. If the requested information is in the L1 data array, the information is returned from the L1 data array to the processor. If a search of the L1 tag array indicates that the information is not in the L1 cache, then a cache miss is forwarded to the L2 cache. This causes a request to be sent to the L2 tag array and L2 data array. If a search of the L2 tag array indicates that the requested information is in the L2 data array, the information is returned from the L2 data array to the processor. If such a search indicates that the requested information is not in the L2 data array, then the request is forwarded to the next level in the memory hierarchy, which may be another cache or may be the system RAM.

BRIEF DESCRIPTION OF THE DRAWINGS

The various embodiments of the present invention are illustrated by way of example, and not by way of limitation, in the figures of the accompanying drawings and in which:

FIG. 9A is a block diagram illustrating both an exemplary in-order pipeline and an exemplary register renaming, out-of-order issue/execution pipeline according to examples.

FIG. 9B is a block diagram illustrating both an exemplary example of an in-order architecture core and an exemplary register renaming, out-of-order issue/execution architecture core to be included in a processor according to examples.

DETAILED DESCRIPTION

Figure 1:
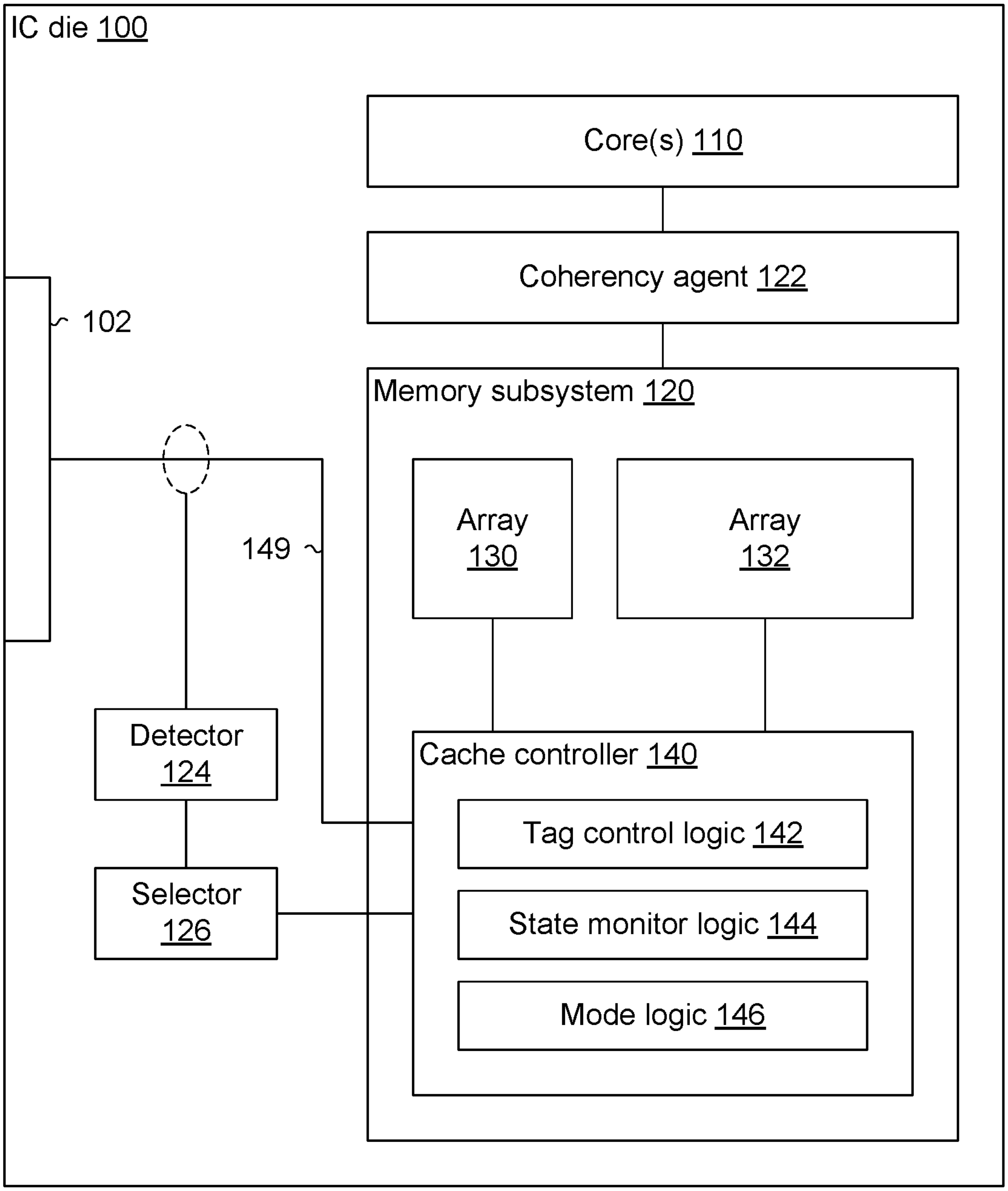
FIG. 1 shows a functional block diagram illustrating features of an integrated circuit (IC) die to selectively provide functionality of a cache array according to an embodiment.

Embodiments discussed herein variously provide techniques and mechanisms for selectively configuring an integrated circuit (IC) die to provide a tag array, where such configuring is based on a determination as to whether another IC die is available to provide a cache array. A common limitation of some families of integrated circuit (IC) die products is that, for a given family, different IC dies in that family are characterized by different cache requirements, or are otherwise associated with different cache characteristics. Typically, a manufacturer will produce and market both a first IC die, which has a relatively small cache, and a second IC die which has a relatively large cache, but which is similar to the first IC die in many other respects. This sort of limited variety in IC die production and marketing tends to be inefficient for various technical and commercial reasons.

To mitigate or prevent such inefficiency, some embodiments variously provide an IC die which comprises multiple arrays of memory cells, and which further comprises circuit to selectively determine whether—for a given one such array—whether that array is to be operated as a cache array, or as a tag array (or a tag and status array). In an embodiment, such selective determining is based on a determination as to whether the IC die is coupled to some other IC die which is able to make available a cache array.

Certain features of various embodiments are described herein with reference to a device, such as an integrated circuit (IC) die, which is (re)configurable to operate according to any of multiple available modes—"operational modes" herein—which variously determine the functionality of one or more arrays of memory cells of said device. Such a device is "(re)configurable" at least insofar as an operational mode of the device can be configured only once—e.g., during a manufacture stage, an assembly stage, a boot-up stage or the like—or can be reconfigured at least once (for example, during a runtime operation of the device).

While various embodiments described herein may use the term System-on-a-Chip or System-on-Chip ("SoC") to describe a device or system having a processor and associated circuitry (e.g., Input/Output ("I/O") circuitry, power delivery circuitry, memory circuitry, etc.) integrated monolithically into a single Integrated Circuit ("IC") die, or chip, the present disclosure is not limited in that respect. For example, in various embodiments of the present disclosure, a device or system may have one or more processors (e.g., one or more processor cores) and associated circuitry (e.g., Input/Output ("I/O") circuitry, power delivery circuitry, etc.) arranged in a disaggregated collection of discrete dies, tiles and/or chiplets (e.g., one or more discrete processor core die arranged adjacent to one or more other die such as memory die, I/O die, etc.). In such disaggregated devices and systems the various dies, tiles and/or chiplets may be physically and electrically coupled together by a package structure including, for example, various packaging substrates, interposers, interconnect bridges and the like.

In some embodiments, an operational mode of a device (such as an IC die) is selected based on a determination as to whether the device is coupled to have access to an array of memory cells (a "memory cell array" or, for brevity, "array" herein) of some other external device (such as another IC die). In one such embodiment, the selected operational mode determines whether a given memory array of the device is to be operated as a particular one of a cache array, a tag array, a state array, or the like.

As used herein, "cache array" refers to an array which is configured to function as a repository of a cached version of data, instructions and/or other information which has been stored in another memory resource. A cache array which is to store cached versions of data is referred to herein as a "data cache array," or simply a "data cache." By contrast, "tag array" refers herein to an array which is configured to function at least as a repository of tag information which (for example) specifies or otherwise indicates at least a portion of an address of a location in the other memory resource. Furthermore, "state array" (or alternatively, "status array") refers herein to an array which is configured to function at least as a repository of metadata which corresponds to—and is to be distinguished from—tag information and/or cached information which is indicated by such tag information. In some embodiment, an array is configured to provide both functionality of a tag array and functionality of a state array. Such an array is referred to herein as a "tag and state array" (or, alternatively a "tag and status array"). The term "tag (and state) array" is used herein to refer to an array which is either configured to provide only functionality of a tag array, or configured to provide functionality of a tag and state array.

Some embodiments variously provide an operational mode whereby two or more physically distinct arrays of an IC die are to provide the same functionality, such as a tag (and state) array functionality. Such arrays are physically distinct (for example) at least insofar as they have different respective decoder circuits, row driver circuits, column driver circuits, sense amplifiers and/or the like. However, some embodiments variously enable two (or more) such physically distinct arrays to be operated, in combination with each other, as a single "logical" array. In one such embodiment, a given operational mode of an IC die configures two arrays of the IC die to be operated together as one logical tag (and state) array, for example.

The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including an IC die that is able to selectively configure operation of a tag array.

FIG. 1 shows an integrated circuit (IC) die 100 to selectively provide functionality of a cache array according to an embodiment. The IC die 100 illustrates one example of an embodiment wherein one device is operable to determine, based on a state of connectivity to another device, whether an array is to be operated to provide data cache functionality.

As shown in FIG. 1. IC die 100 comprises a one or more processor cores 110, a coherency agent 122, and a memory subsystem 120 which is accessible to core(s) 110 and coherency agent 122. IC die 100 is a part of and/or is implemented on a substrate using any of a number of process technologies, such as, for example, complementary metal-oxide-semiconductor (CMOS), bipolar CMOS (BiCMOS), or n-type metal-oxide-semiconductor (NMOS). In some embodiments, IC die 100 has a system-on-a-chip (SOC) configuration.

Core(s) 110 each comprise respective circuitry for generating requests to access data, instructions and/or other information. At a given time during operation of IC die 100, some or all such information which is subjected to being cached in IC die 100 (or, for example, cached in a larger system which includes IC die 100). In some embodiments, IC die 100 comprises one or more processors, although core(s) 110 of a single processor is illustrated in FIG. 1 for simplicity. The processor comprising core(s) 110 is any type of data processor comprising a general purpose or special purpose central processing unit (CPU), an application-specific integrated circuit (ASIC) or a digital signal processor (DSP). For example, the processor of IC die 100 is a general-purpose processor, such as a Core™ i3, i5, i7, 2 Duo and Quad, or Xeon™ processor, all of which are available from Intel Corporation, of Santa Clara, Calif. Alternatively, the processor is from another company, such as ARM Holdings, Ltd, of Sunnyvale, Calif., MIPS Technologies of Sunnyvale, Calif., etc. The processor of IC die 100 is a special-purpose processor, such as, for example, a network or communication processor, compression engine, graphics processor, co-processor, embedded processor, or the like.

In many embodiments, core(s) 110 each comprise respective internal functional blocks such as one or more execution units, retirement units, a set of general purpose and specific registers, etc. If a given one of core(s) 110 is multi-threaded or hyper-threaded, then each hardware thread is considered as a "logical" core as well. Core(s) 110 are homogenous (or alternatively, heterogeneous) in terms of architecture and/or instruction set. For example, some such core is in-order while one or more other cores are out-of-order. As another example, two or more of core(s) 110 are capable of executing the same instruction set, while others are capable of executing only a subset of that instruction set or a different instruction set, in some embodiments.

IC die 100 also comprises a coherency agent 122 which comprises circuitry to coordinate operation with core(s) 110. In an embodiment coherency agent 122 includes (or alternatively, is coupled to operate with) circuitry that is configured to facilitate the determining of how a given memory access request is to be routed to a particular one of various available resources (which are referred to herein as "memory access resources"). Coherency agent 122 facilitates the maintaining of coherency between data which is variously cached by different cores and/or by other devices that access the same portions of a memory. By way of illustration and not limitation, such circuitry comprises one or more route tables and/or other suitable information to facilitate a reading from, writing to and/or other access of a given memory resource. In other embodiments, IC die 100 omits coherency agent 122—e.g., in embodiments where IC die 100 has only one processor core and/or where IC die 100 is not sharing a memory resource with another IC die.

Some cache systems variously use multiple arrays of memory cells, where each such array is a repository of a different respective type of information. Traditionally, a cache system includes at least one array of memory cells (a "memory cell array," or simply "array" herein) is hardwired to function as a cache array—i.e., a repository for cached versions of data, instructions and/or the like.

In some instances, such a cache system includes another array of memory cells which is hardwired to function as a corresponding "tag array"—i.e., a repository of tag information which indicates a location in the cache array to which information has been cached and/or from which cached information is to be read. Cells of a tag array are arranged in sets (e.g., rows) and ways (e.g., columns), wherein, at a given time, some or all entries of such a tag array are variously used each to store a tag which facilitates identification of a respective portion of a corresponding cache array. For example, typically, a given line of a data cache array (or, for brevity, "data cache" herein) stores a cached version of data which is currently at a particular location of a memory block. Such a line of the cache array (a "cache line") corresponds to an entry of the tag array, where said entry includes a tag field which, for example, is indicative of at least an upper portion of an address of the memory block.

The processing of an instruction by a CPU or other processor usually includes or is otherwise based on the identification of address information which is used to determine whether (and if so, how) information is to be retrieved from a cache array. In a typical scenario, such information includes (for example) some or all of a tag field which is indicative of an upper portion of an address of a memory block, a set field which is indicative of the lower portion of the address, and a byte offset field which defines the byte to be taken from the data. Based on a value of the tag field, a tag array is searched to determine whether a corresponding cache array currently has a cached version of the information which is requested.

In some instances, a cache system also includes another array of memory cells which is hardwired to function as a corresponding "state array" (sometimes referred to as a "status array")—i.e., a repository of metadata which variously corresponds to information in a cache array. Such metadata has any of various uses—e.g., for determining whether and/or how cached data is to be read, selected for replacement, and/or the like. Typically, a status array and a tag array each have the same number of entries, wherein each entry in the status array (or "status array entry") corresponds to a different respective entry of the tag array (or "tag array entry"). A given status array entry comprises one or more fields of metadata. By way of illustration and not limitation, the one or more fields comprise a validity field which specifies whether the corresponding cached data is currently valid. Alternatively or in addition, the one or more fields comprise a coherency state field which identifies a particular state—e.g., one of a modified (M) state, an exclusive (E) state, a shared (S) state, or an invalid (I) state of a MESI protocol—of the cached data indicated in the corresponding tag array entry. Alternatively or in addition, the one or more fields comprise a parity field which indicates a parity of value in the corresponding tag array entry, and/or a least recently used (LRU) field which indicates a recency of use of the corresponding tag array entry.

In some instances, the respective functionalities of a tag array and a status array are combined in a single array of memory cells which is referred to as a "tag and state array" (or "tag and status array"). For example, a given entry of a tag and state array corresponds to a line of cache array, wherein the entry includes a tag field (which is indicative of at least an upper portion of an address of a corresponding memory block), and one or more fields of metadata such as any of those described above.

Some embodiments improve on existing cache systems by variously providing an IC die which comprises multiple arrays of memory cells, and circuitry which is (re)configurable to selectively operate some or all of the multiple arrays each as a respective one of a cache array, a tag array, a status array, or a tag and status array. Such (re)configurability is to be distinguished, for example, from having an array which is hardwired to always by a cache array, another array which is hardwired to always by a tag array, etc. For example, in one mode of operation of such an IC die, some embodiments operate a first array as a cache array (e.g., a data cache, or an instruction cache). However, in another mode of operation of that same IC die, such embodiments instead operate the first array as repository of at least tag information—e.g., wherein the first array is to function as a tag array only, or as a tag and state array.

By way of illustration and not limitation, memory subsystem 120 comprises two or more arrays—such as the illustrative arrays 130, 132 shown—which each comprise respective rows and columns of memory cells (SRAM cells, for example). The two or more arrays are variously coupled to be accessed and/or otherwise operated by a cache controller 140 of memory subsystem 120. Cache controller 140 provides functionality to maintain a cache array (such as a data cache) and/or to maintain one or more repositories of information which facilitate an accessing of a cache array by coherency agent 122—e.g., on behalf of core(s) 110. Such one or more repositories include a tag array (e.g., a tag and state array), for example.

For example, cache controller 140 includes tag control logic 142, circuitry of which is operable to generate, update and/or otherwise determine tag information which is to be included in a tag array (such as a tag and state array) which—depending on a given operational mode of cache controller 140—is to be provided with a particular one of arrays 130, 132. Additionally or alternatively, cache controller 140 includes state monitor logic 144, circuitry of which is operable to generate, update and/or otherwise determine metadata which is to be included in a state array (such as a tag and state array) which—depending on a given operational mode of cache controller 140—is to be provided with a particular one of arrays 130, 132. In some embodiments, operations of tag control logic 142, state monitor logic 144, and/or other circuitry of cache controller 140—where such operations maintain information in a cache array and/or to maintain information in a tag (and state) array—includes operations which, for example, are adapted from conventional cache management techniques. Certain features of such techniques are not limiting on such embodiments, and are not detailed herein to avoid obscuring the description of such embodiments.

In various embodiments, cache controller 140 includes any of various combinations and/or arrangements of integrated circuitry which are suitable to maintain or otherwise access the two or more arrays according to a currently configured one of multiple possible operational modes. In one such embodiment, mode logic 146 of cache controller 140 comprises circuitry which is configurable—e.g., statically configurable, or (alternatively) dynamically reconfigurable—to determine a functionality to be provided with array 130 and/or a functionality to be provided with array 132, where such provisioning is according to any of multiple modes comprising at least a first mode and a second mode.

In an illustrative scenario according to one embodiment, the first mode of operation of cache controller 140—provided, for example, based on a first configuration of mode logic 146—includes or otherwise results in array 130 being operated as at least a tag array (e.g., as a tag and state array, in some embodiments), and array 132 being operated as a cache array which corresponds to the tag (and state) array. During such a first mode, array 130 is operated to provide entries, and array 132 is operated to provide cache lines (such as lines of cached data), some or all of which, at a given time, each correspond to a respective one of said entries. For example, a given cache line provided with array 132 includes a cached version of information which is at a location in a particular memory block. The given cache line corresponds to a particular entry which is provided with array 130, wherein the particular entry includes tag information which includes at least a portion of an address of the memory block.

In one such embodiment, the second mode of operation of cache controller 140—provided, for example, based on a second configuration of mode logic 146—includes or otherwise results in array 132 being operated as at least part of a tag array (e.g., as at least part of a tag and state array, in some embodiments). For example, the second mode includes or otherwise results in array 132 providing an entire tag array (e.g., an entire tag and state array), and further results in a remote array of memory cells—i.e., an array which is distinct from, but coupled to, IC die 100—being operated as a cache array which corresponds to that tag (and state) array.

In one such embodiment, the second mode includes or otherwise results in array 130, for example, being disabled from use a cache array (and, for example, being disabled from use a tag array). In some embodiments, the second mode (or a different one of the multiple modes) includes or otherwise results in arrays 130, 132 being operated in combination with each other to provide a logical tag array—e.g., by providing a logical tag and state array, in some embodiments—and further results in a remote array being operated as a cache array which corresponds to said logical tag array.

By way of illustration and not limitation, IC die 100 further comprises a hardware interface 102 by which IC die 100 is to be coupled to one or more other IC dies. Hardware interface 102 comprises conductive contacts (e.g., including any of various metal pads, bumps, balls, pins or the like) which facilitate a communication of data signals, control signals, clock signals and/or the like—e.g., wherein hardware interface 102 includes any of various die-to-die (D2D) interconnect structures adapted from conventional die assembly techniques.

In one such embodiment, IC die 100 further comprises a detector 124 and a selector 126 which are variously coupled to (or alternatively, are each a component of) cache controller 140. Detector 124 comprises any of various types of integrated circuits which are suitable to be coupled to detect for the presence, or absence, of a condition—referred to herein as a "connectivity condition"—wherein another IC die (not shown) is electrically connected to circuitry of IC die 100 via hardware interface 102. In some embodiments, detection of the connectivity condition further comprises detector 124 (or other suitable circuitry of IC die 100) determining that the other IC die (if any) includes an array of memory cells which, according to some predetermined criteria, is suitable to function as a cache array for use by coherency agent 122 and/or core(s) 110. In the example embodiment shown, detector 124 is coupled to snoop or otherwise detect for signal communications via a line 149 by which cache controller 140 is to communicate with said other IC die (if any). However, some embodiments are not limited to a particular circuit configuration by which detector 124 is coupled to detect for such a connectivity condition.

In an embodiment, detector 124 performs monitoring to determine whether a connectivity condition is present or absent. Based on such determining, detector 124 generates a signal which specifies or otherwise indicates, to selector 126, the presence or absence of the connectivity condition—e.g., wherein the signal indicates whether or not a remote array of memory cells is available via hardware interface 102 for use as a cache array.

Based on the determining by detector 124, selector 126 signals mode logic 146 to configure a selected one of multiple possible operational modes of cache controller 140. For example, in one such embodiment, selector 126 is preprogrammed or otherwise preconfigured with reference information which corresponds various operational modes of cache controller 140 each with a different respective one of multiple connectivity conditions—e.g., where one such connectivity condition includes an availability of a remote memory array via hardware interface 102, and another such connectivity condition includes an unavailability of any such remote memory array via hardware interface 102. Based on detector 124 providing an indication of a particular connectivity condition, selector 126 selects a corresponding operational mode which is to be configured with mode logic 146.

Responsive to selector 126, one or more switches, multiplexers, demultiplexers, and/or other suitable circuits of mode logic 146 are variously operated to configure the selected operational mode of cache controller 140. In some embodiments, configuration of an operational mode of cache controller 140 is additionally or alternatively implemented with firmware. By way of illustration and not limitation, mode logic 146 includes or otherwise operates circuitry which is (re)configurable to select between enabling or disabling communication via a path by which tag information and/or metadata is to be sent from cache controller 140 to array 130. Alternatively or in addition, mode logic 146 includes or otherwise operates circuitry which is (re)configurable to select between a path by which data is to be sent from cache controller 140 to array 132, and an alternative path by which tag information and/or metadata is to be sent from cache controller 140 to array 132. Alternatively or in addition, mode logic 146 includes or otherwise operates circuitry which is (re)configurable to select between enabling or disabling communication via one or more interconnects (e.g., including the illustrative line 149 shown) by which data is to be sent from cache controller 140 to a cache array of another IC die (if any).

In some embodiments, tag control logic 142 and/or other suitable circuitry of cache controller 140 is (re)configurable to selectively process any of various different formats for address information which is used to search a tag (and state) array and/or a cache array. In one such embodiment, configuration of a given operational mode of cache controller 140 comprises selector 126, mode logic 146, or other suitable circuitry of IC die 100 signaling to tag control logic 142 that one address information format is to be selected for use over one or more alternative address information formats. Some or all such formats include tag fields of different respective sizes, for example.

In some embodiments, cache controller 140 provides functionality to detect a hit or a miss of what is referred to herein as a "superline"—i.e., a set of multiple consecutive cache lines that share a single tag. For example, tag control logic 142 and/or state monitor logic 144 provide additional functionality to track whether (or not) a given line of a cache array is one of multiple cache lines which are contiguous with each other in the cache array, and which each correspond to the same upper portion of a memory block address. In one such embodiment, cache controller 140 supports functionality to indicate, in a corresponding entry of a tag (and state) array, whether the cache line in question is in any such superline. In some embodiment, mode logic 146 (or other suitable circuitry of cache controller 140) is operable to selectively enable or disable such functionality, according to the operational mode which is selected by selector 126 based on detector 124.

In providing any of multiple operational modes, to variously operate array 130 and/or array 132, some embodiments enable IC die 100 to be adapted for efficient use in any of various applications which have different cache requirements. Such embodiment thus mitigate the need for manufacturers to produce and market IC dies which have relatively small variations to meet such different cache requirements.

Figure 2:
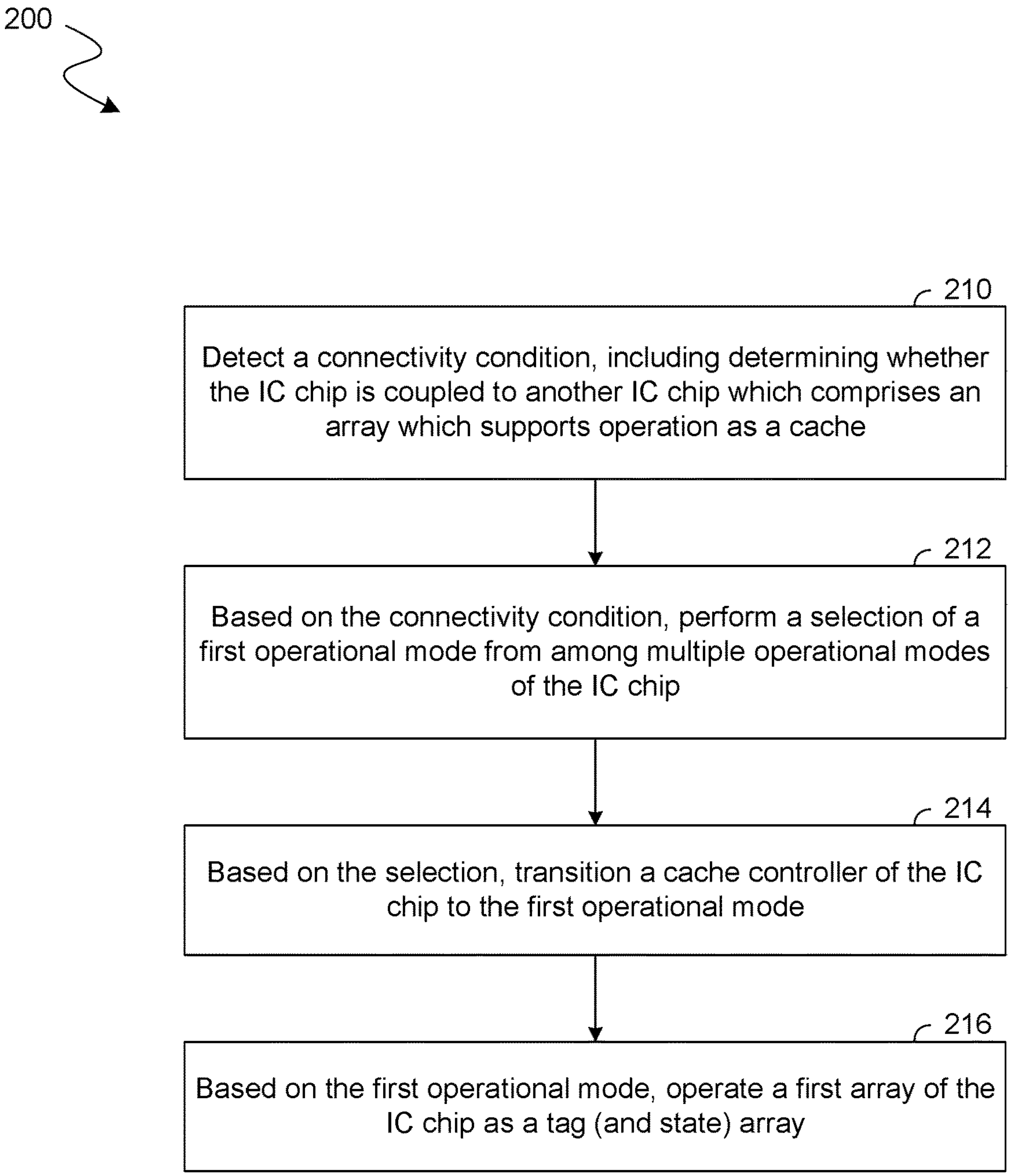
FIG. 2 shows a flow diagram illustrating features of a method to operate an IC die according to an embodiment.

FIG. 2 shows a method 200 to operate a device which comprises configurable memory resources according to an embodiment. Method 200 illustrates one example of an embodiment wherein one operational mode is selected, from among two or more operational modes of a device (in this example, an IC die), to determine which of multiple arrays of the device are to provide a particular one of a tag array functionality, or a cache array functionality. Operations such as those of method 200 are performed, for example, with circuitry of IC die 100.

As shown in FIG. 2, method 200 comprises (at 210) detecting a connectivity condition, including determining whether the IC die is coupled to another IC die which comprises an array which supports operation as a cache array. By way of illustration and not limitation, the detecting at 210 is performed with detector 124, in some embodiments. The detecting at 210 includes, for example, monitoring for the presence (or absence) of communications via a hardware interface by which the IC die is to be coupled to another IC die (if any). In some embodiments, the detecting at 210 further comprises determining whether some other IC die (if any) is able to make an array of memory cells available for use as a cache array by a cache controller (or other suitable circuitry) of the IC die which performs method 200. In one such embodiment, the detecting at 210 comprises identifying a size of an array (if any) which is available for use by such a cache controller.

Based on the connectivity condition which is detected at 210, method 200 (at 212) performs a selection of a first operational mode from among multiple operational modes of the IC die. In an embodiment, the IC die comprises two or more arrays of memory cells (such as arrays 130, 132), wherein the multiple operational modes each determine respective functionalities to be provided by some or all of the two or more arrays. By way of illustration and not limitation, the operational modes comprise one operational mode wherein a first array of the IC die is to be operated as a tag (and state) array, and wherein a second array of the IC die is to be operated as a cache array. Alternatively or in addition, the operational modes comprise another operational mode wherein the second array of the IC die is to be operated as a tag (and state) array, and wherein the first array of the IC die is to be prevented from operation as either one of a tag (and state) array or a cache array. Alternatively or in addition, the operational modes comprise another operational mode wherein the first array and the second array of the IC die are each to be operated as a respective tag (and state) array, and wherein a third array of a different IC die is to be operated as a cache array.

Based on the selection which is performed at 212, method 200 (at 214) transitions a cache controller of the IC die to the first operational mode. Subsequently, method 200 (at 216) operates one array of the IC die—e.g., the first array, for example—as a tag (and state) array, based on the first operational mode.

In some embodiments, method 200 includes additional operations (not shown) which, for example, transition the cache controller to an operational mode other than the first operational mode selected at 212. By way of illustration and not limitation, such additional operations include receiving an indication that a characteristic of power consumption with the IC die has changed. Based on such an indication, another one of the multiple operational modes of the cache controller is selected. In one example scenario, the indication of a changed power consumption characteristic results in a determination that a new performance requirement (e.g., a different cache performance requirement, a different memory bandwidth requirement, and/or the like) needs to be met by transitioning between the first operational mode and a different operational mode. In another example scenario, the indication of a changed power consumption characteristic results in a determination that more a power efficient use of resources is available by transitioning between the first operational mode and a different operational mode. Based on changed power consumption characteristic, the cache controller is transitioned to the different operational mode, and one or more arrays of the IC die are operated based on said mode.

Figure 3:
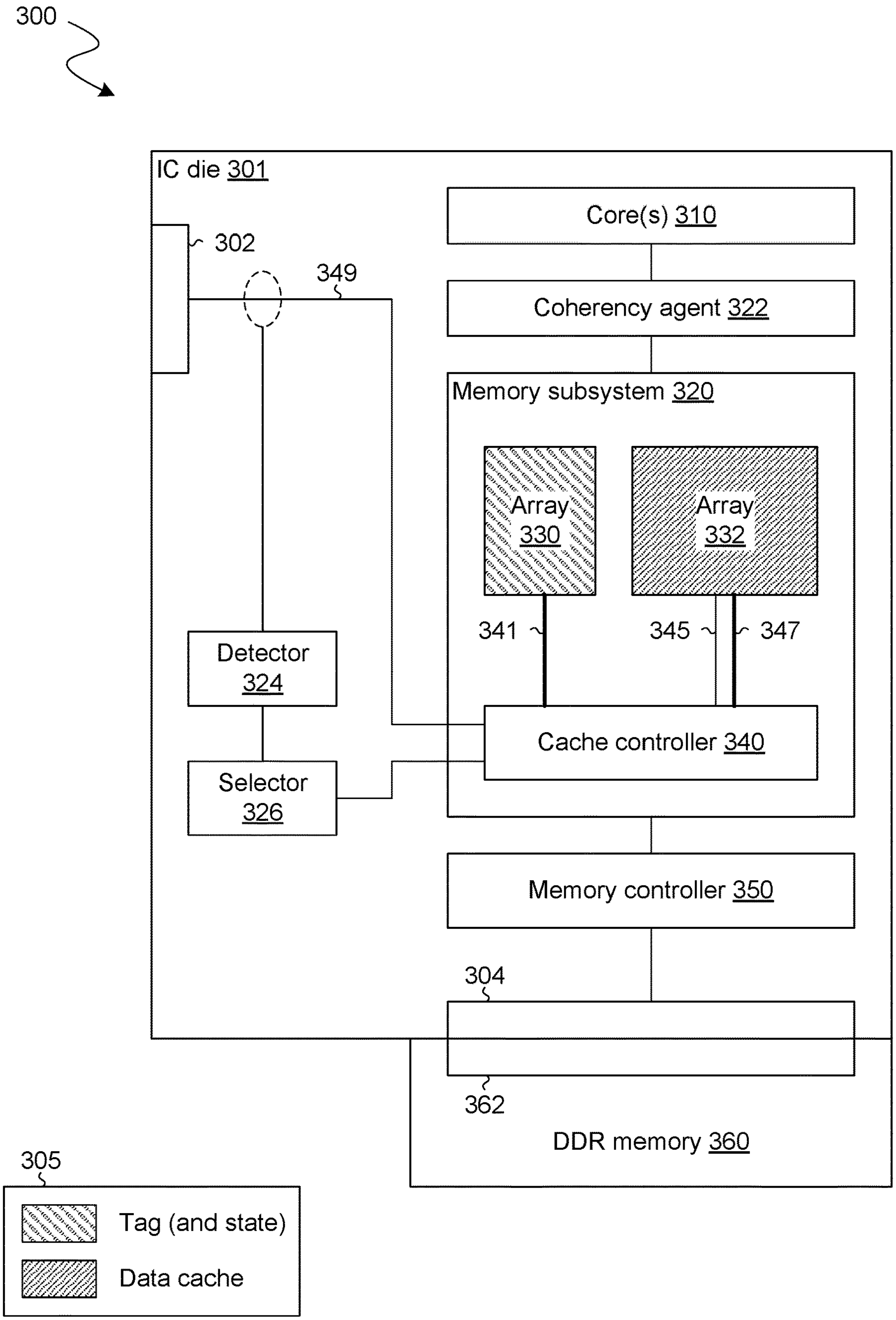
FIG. 3 shows a functional block diagram illustrating features of a system to selectively provide tag array functionality and cache array functionality with an IC die according to an embodiment.

FIG. 3 shows a system 300 to selectively provide tag array functionality and cache array functionality with an apparatus such as an IC die according to an embodiment. The system 300 illustrates one example of an embodiment wherein a device is selectively configured based on a connectivity condition which precludes the possibility of the device using a memory cell of another device as a cache array. In various embodiments, system 300 provides functionality such as that of IC die 100—e.g., wherein one or more operations of method 200 are performed with IC die 301.

As shown in FIG. 3, system 300 comprises an IC die 301 and a double data rate (DDR) memory 360 which is coupled thereto—e.g., wherein respective hardware interfaces 304, 362 couple IC die 301 and DDR memory 360 to each other. IC die 301 provides functionality, such as that of IC die 100, to selectively configure any of multiple operational modes that variously determine the functionality to be provided with one or more memory cell arrays.

By way of illustration and not limitation, IC die 301 comprises a hardware interface 302, one or more processor cores 310, a memory subsystem 320, a coherency agent 322, a memory cell array 330, another memory cell array 332, and a cache controller 340 which—for example—correspond functionally to hardware interface 102, core(s) 110, memory subsystem 120, coherency agent 122, array 130, array 132, and cache controller 140 (respectively). Furthermore, a detector 324, and a selector 326 of system 300 provide functionality such as that of detector 124, and selector 126 (respectively). A memory controller 350 facilitates access to DDR memory 360 on behalf of core(s) 310—e.g., wherein cache controller 340 supports functionality to provide cached versions of at least some data which is accessible from DDR memory 360 via memory controller 350.

In various embodiments, cache controller 340 includes circuitry (e.g., providing functionality such as that of mode logic 146) which implements (re)configuration of cache controller 340 to any of multiple operational modes, where each such mode determines a respective functionality to be provided with array 330 and/or a respective functionality to be provided with array 332. In one such embodiment, cache controller 340 is (re)configurable to selectively enable or disable communication via a signal path—e.g., including that of the illustrative line 341 shown—with which cache controller 340 sends and receives tag information or metadata (state array information) with array 330. Alternatively or in addition, cache controller 340 is (re)configurable to select between one signal path (e.g. including that of the illustrative line 345 shown) with which cache controller 340 sends and/or receives tag information or metadata with array 332, and another signal path (e.g. including that of the illustrative line 347 shown) with which cache controller 340 sends and/or receives data for caching with array 332. Alternatively or in addition, cache controller 340 is (re) configurable to selectively enable or disable communication via a signal path—e.g., including that of the illustrative line 349 shown—with which cache controller 340 sends and/or receives data, instructions or other information with hardware interface 302. However, some embodiments use any of various additional or alternative combination of switch states and/or other circuit configurations each to implement a respective operational mode of cache controller 340.

In the example embodiment shown, detector 324 is coupled to detect a first connectivity condition wherein IC die 301 is not coupled via hardware interface 302 to any other IC die is able to provide a cache array for use by memory subsystem 320. In the example embodiment shown, detector 324 is coupled to snoop or otherwise detect for communications—e.g., on one or more signal lines such as the illustrative line 349 shown—by which cache controller 340 (or other suitable circuit logic of IC die 301) is to discover a capability information about any such other IC die. Based on the detection of the first connectivity condition, detector 324 sends to selector 326 an indication of an unavailability of a cache array via hardware interface 302.

Based on the indicated unavailability of a remote cache array, selector 326 selects a corresponding first operational mode which determines a functionality to be provided by array 330 and/or a functionality to be provided by array 332. Subsequently, selector 326 signals cache controller 340 to configure the selected first operational mode. In one such embodiment, the first operational mode includes or otherwise results in array 332 being operated as a cache array, and array 330 being operated as a tag (and state) array to facilitate accessing the cache array of array 332. The legend 305 shows how FIG. 3 represents various functionalities which are provided by the first operational mode.

In the example embodiment shown, the first operational mode enables communications, via line 341, of tag information and/or metadata between cache controller 340 and array 330. Furthermore, the first operational mode disables communications, via line 345, of tag information and/or metadata between cache controller 340 and array 332. Further still, the first operational mode enables communications, via line 347, of data (or other information) which has been or is to be cached by array 332. Further still, the first operational mode disables communications, via line 349, of data (or other information) which, in another mode, would be cached remotely.

In some embodiments, the first operational mode further configures cache controller 340 to use a first format for address information which is to be used to access arrays 330, 332. Additionally or alternatively, the first operational mode further configures cache controller 340 to disable functionality which tracks whether a given cache line provided with array 332 is in a superline, and/or to disable functionality which detects a hit or a miss of a superline.

Figure 4:
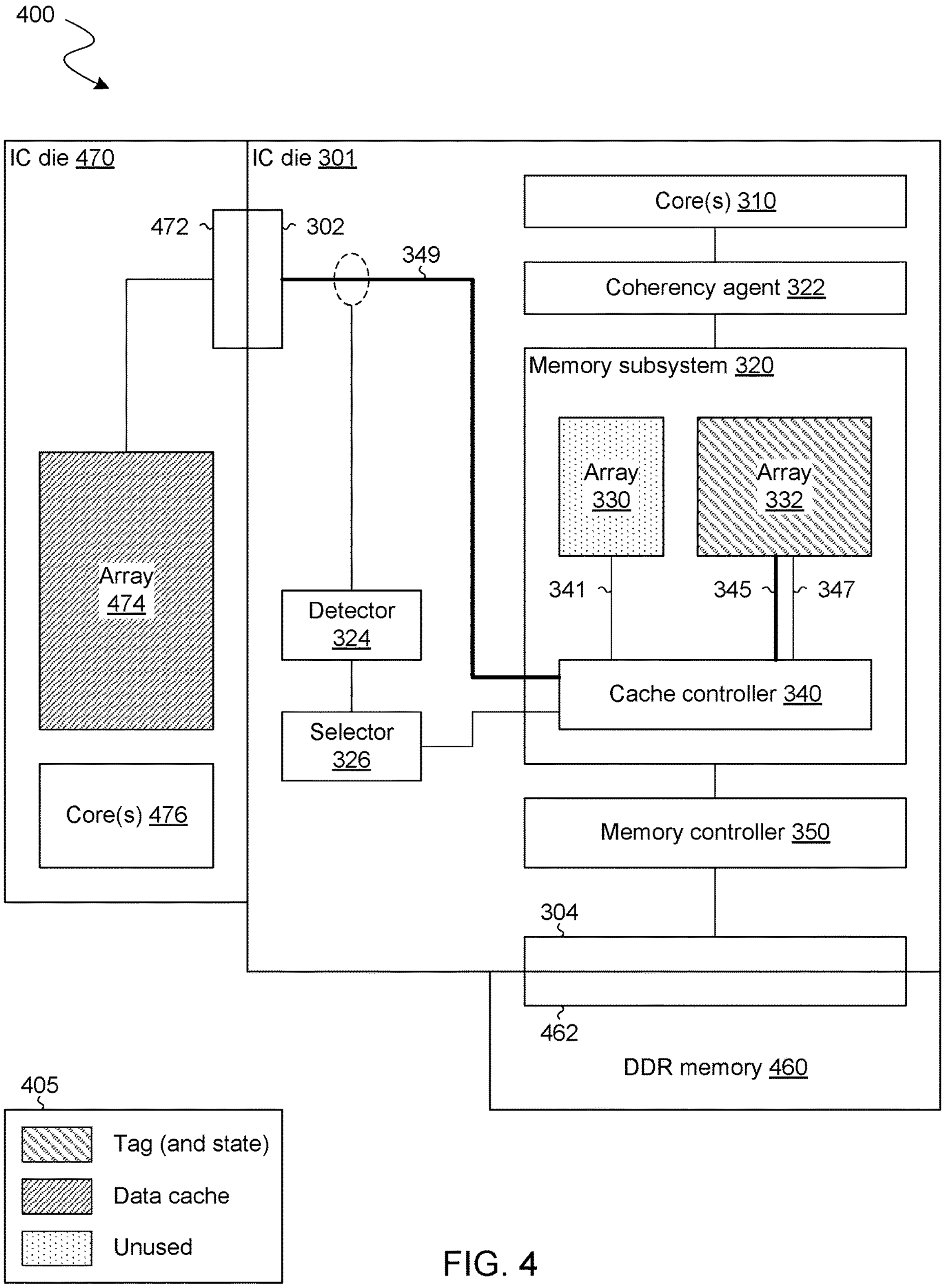
FIG. 4 shows a functional block diagram illustrating features of a system to determine the provisioning of tag array functionality and cache array functionality with multiple IC dies according to an embodiment.

FIG. 4 shows a system 400 to determine the provisioning of tag array functionality and cache array functionality with multiple IC dies according to an embodiment. The system 400 illustrates one example of an embodiment which is selectively configured based on an availability of a remote cache to function as a data cache. In various embodiments, system 400 provides functionality such as that of IC die 100 or of system 300—e.g., wherein one or more operations of method 200 are performed with IC die 301.

As shown in FIG. 4, system 400 comprises the IC die 301 and a double data rate (DDR) memory 460 which is coupled thereto—e.g., wherein respective hardware interfaces 304, 462 couple IC die 301 and DDR memory 460 to each other. System 400 further comprises another IC die 470, wherein IC dies 301, 470 are coupled to each other via respective hardware interfaces 302, 472. In an embodiment, IC die 470 comprises an array 474 of memory cells (e.g., including SRAM cells, DRAM cells, or the like). In an embodiment, array 474 is larger than array 332. Although some embodiments are not limited in this regard, IC die 470 comprises any of various other circuit components, such as the illustrative one or more processor cores 476 shown.

In the example embodiment shown, detector 324 is coupled to detect a second connectivity condition wherein IC die 301 is instead coupled via hardware interface 302 to IC die 470, which is able to provide array 474 for use by memory subsystem 320 as a cache array. In an embodiment, detection of the second connectivity condition includes detector 324 determining that array 474 is smaller than a predetermined threshold maximum size which (for example) corresponds to relatively small required size for a tag (and state) array which is to be provided with IC die 301. Based on the detection of the second connectivity condition, detector 324 sends to selector 326 an indication of an availability of array 474 via hardware interface 302 (e.g., wherein array 474 is identified to selector 326 as being below the threshold maximum size).

Based on the indicated availability of array 474 (and, for example, based on the indicated size of array 474), selector 326 selects a corresponding second operational mode which determines a functionality to be provided by array 330 and/or a functionality to be provided by array 332. Subsequently, selector 326 signals cache controller 340 to configure the selected second operational mode. In one such embodiment, the second operational mode includes or otherwise results in array 332 being operated as a tag (and state) array, array 474 being operated by cache controller 340 as a cache array, and array 330 being disabled from operation as either one of a cache array or a tag array. The legend 405 shows how FIG. 4 represents various functionalities which are provided by the second operational mode.

In the example embodiment shown, the second operational mode disables communications, via line 341, of tag information and/or metadata between cache controller 340 and array 330. Furthermore, the second operational mode enables communications, via line 345, of tag information and/or metadata between cache controller 340 and array 332. Further still, the second operational mode disables communications, via line 347, of data (or other information) which, in another mode, would be cached by array 332. Further still, the second operational mode enables communications, via line 349, of data (or other information) which has been, or is to be, cached at array 474.

In some embodiments, the second operational mode further configures cache controller 340 to use a second format for address information which is to be used to access array 332. Additionally or alternatively, the second operational mode further configures cache controller 340 to disable functionality which tracks whether a given cache line provided with array 474 is in a superline, and/or to disable functionality which detects a hit or a miss of a superline.

Figure 5:
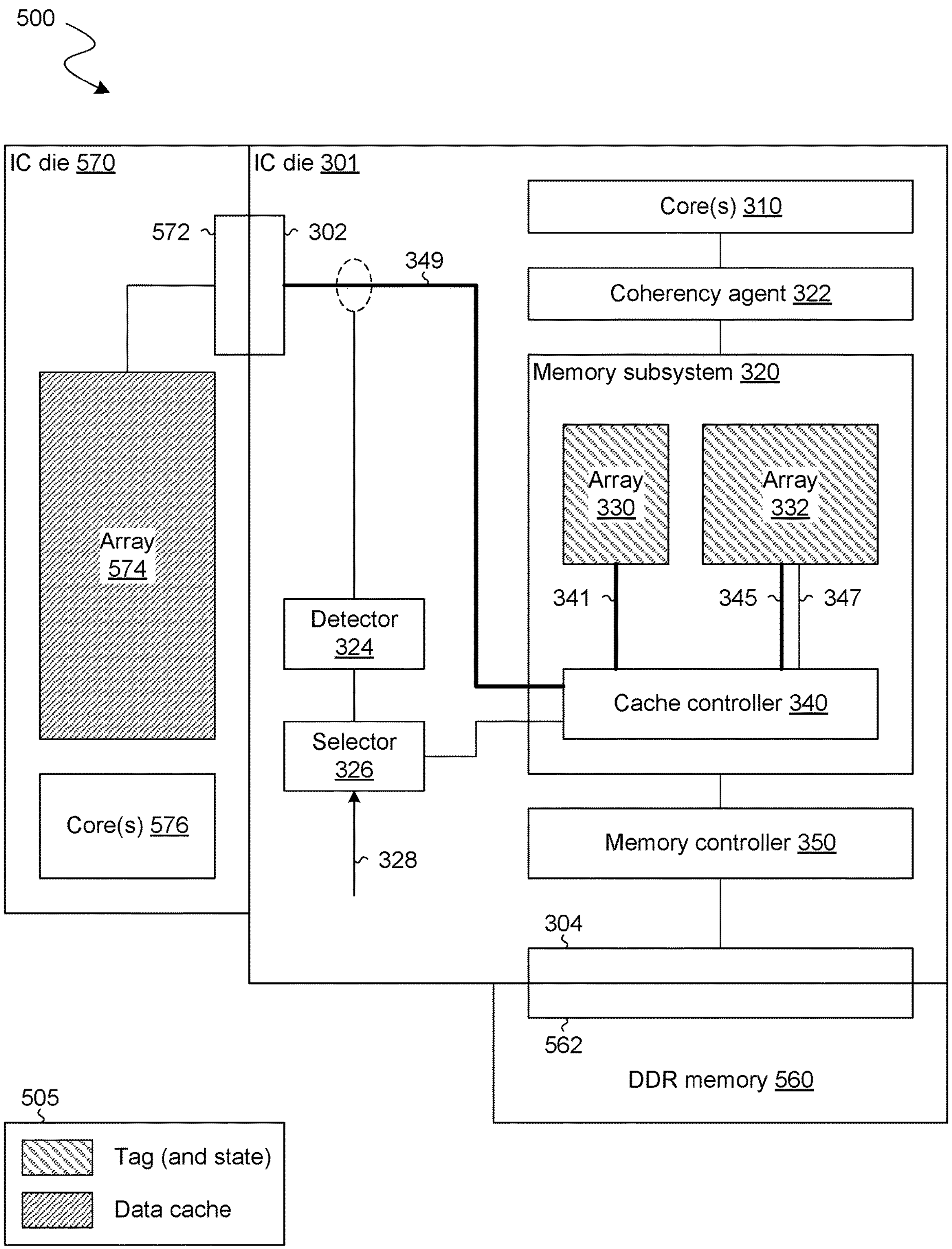
FIG. 5 shows a functional block diagram illustrating features of a system to selectively provide tag array functionality and cache array functionality with multiple IC dies according to an embodiment.

FIG. 5 shows a system 500 to selectively provide tag array functionality and cache array functionality with multiple IC dies according to an embodiment. The system 500 illustrates one example of another embodiment which is selectively configured based on an availability of a remote cache to function as a data cache. In various embodiments, system 500 provides functionality such as that of IC die 100, or of one of systems 300, 400—e.g., wherein one or more operations of method 200 are performed with IC die 301.

As shown in FIG. 5, system 500 comprises the IC die 301 and a DDR memory 560 which is coupled thereto—e.g., wherein respective hardware interfaces 304, 562 couple IC die 301 and DDR memory 560 to each other. System 300 further comprises another IC die 570, wherein IC dies 301, 570 are coupled to each other via respective hardware interfaces 302, 572. In an embodiment, IC die 570 comprises an array 574 of memory cells (e.g., including SRAM cells, DRAM cells, or the like). In an embodiment, array 574 is larger than array 332. Although some embodiments are not limited in this regard, IC die 570 comprises any of various other circuit components, such as the illustrative one or more processor cores 576 shown.

In an illustrative scenario according to one embodiment, detector 324 is coupled to detect a third connectivity condition wherein IC die 301 is instead coupled via hardware interface 302 to another IC die 570 which is able to provide a memory cell array 574 for use by memory subsystem 320 as a cache array. In an embodiment, detection of the second connectivity condition includes detector 324 determining that array 574 is larger than a predetermined threshold minimum size which (for example) corresponds to relatively large required size for a tag (and state) array—e.g., a logical tag (and state) array—which is to be provided with IC die 301. Based on the detection of the third connectivity condition, detector 324 sends to selector 326 an indication of an availability of array 574 via hardware interface 302 (e.g., wherein array 574 is identified as being above the threshold minimum size)

Based on the indicated availability of array 574 (and, for example, based on the indicated size of array 574), selector 326 selects a corresponding third operational mode which determines a functionality to be provided by array 330 and/or a functionality to be provided by array 332. Subsequently, selector 326 signals cache controller 340 to configure the selected third operational mode. In one such embodiment, the third operational mode includes or otherwise results in arrays 330, 332 each being operated as a respective tag (and state) array. The third operational mode further includes or otherwise results in array 574 being operated by cache controller 340 as a cache array—e.g., wherein arrays 330, 332 operate together as one logical tag (and state) array to facilitate the accessing of said cache array. The legend 505 shows how FIG. 5 represents various functionalities which are provided by the third operational mode.

In the example embodiment shown, the third operational mode enables communications, via line 341, of tag information and/or metadata between cache controller 340 and array 330. Furthermore, the third operational mode enables communications, via line 345, of tag information and/or metadata between cache controller 340 and array 332. Further still, the third operational mode disables communications, via line 347, of data (or other information) which, in a different mode, would be cached by array 332. Further still, the third operational mode enables communications, via line 349, of data (or other information) which has been, or is to be, cached at array 574.

In some embodiments, the third operational mode further configures cache controller 340 to use a third format for address information which is to be used to access arrays 330, 332. Additionally or alternatively, the third operational mode further configures cache controller 340 to enable functionality which tracks whether a given cache line provided with array 574 is in a superline, and/or to enable functionality which detects a hit or a miss of a superline.

Although some embodiments are not limited in this regard, IC die 301 further enables a dynamic reconfiguration of IC die 301 while IC die 570 is coupled thereto, wherein such reconfiguration transitions cache controller 340 from one operational mode to another operational mode—e.g., to change a functionality provided with at least one of arrays 330, 332. For example, in one such embodiment, selector 326 is further coupled to receive a signal 328 which specifies or otherwise indicates telemetry information, such as a current or expected future condition of power consumption by system 500. By way of illustration and not limitation, signal 328 is provided by core(s) 310, a power control unit (PCU), a power management unit (PMU), or any of various other suitable hardware or software resources which are included in—or coupled to—IC die 301. In an embodiment, signal 328 indicates to selector 326 that a consumption of power by system 500 has increased (or alternatively, decreased), or is expected to increase (decrease).

Based on such an indication by signal 328, selector 326 determines (for example) that a different operational mode of cache controller 340 is needed to meet a more constraining power/performance requirement. Alternatively, selector 326 determines that the power consumption condition presents an opportunity for more power efficient cache access operations using a different operational mode of cache controller 340. In one example embodiment, signal 328 results in selector 326 transitioning cache controller 340 between the second operational mode which is illustrated in the description of system 400, and the third operational mode which is illustrated in the description of system 500. In some embodiments, reconfiguring cache controller 340 to transition IC die 300 between two operational modes includes (or is otherwise performed in combination with)

operations to empty a cache array—e.g., by writing back all modified cache data to memory, and invalidating all tags. Such operations are performed, for example, with circuitry which provides functionality such as that of coherency agent 122, mode logic 146, and/or other such circuitry.

Figure 6A:
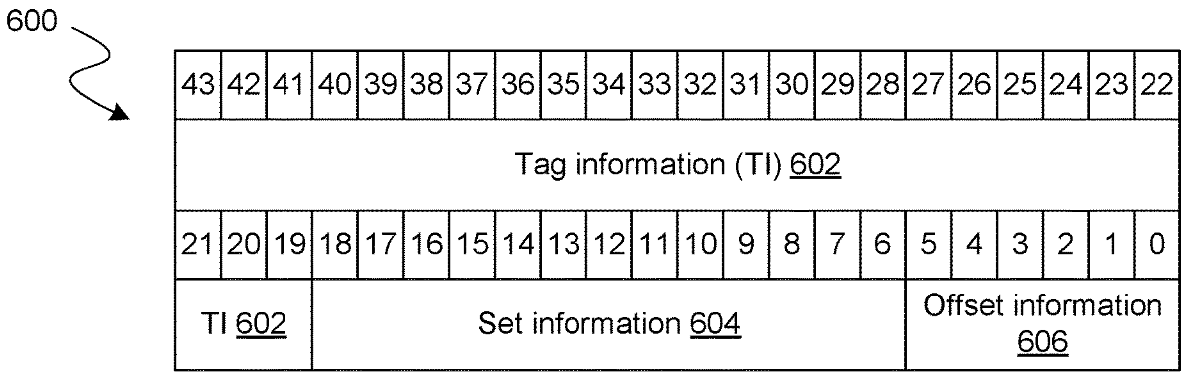
FIGS. 6A-6C are format diagrams illustrating respective features of address information each according to a corresponding embodiment.
Figure 6B:
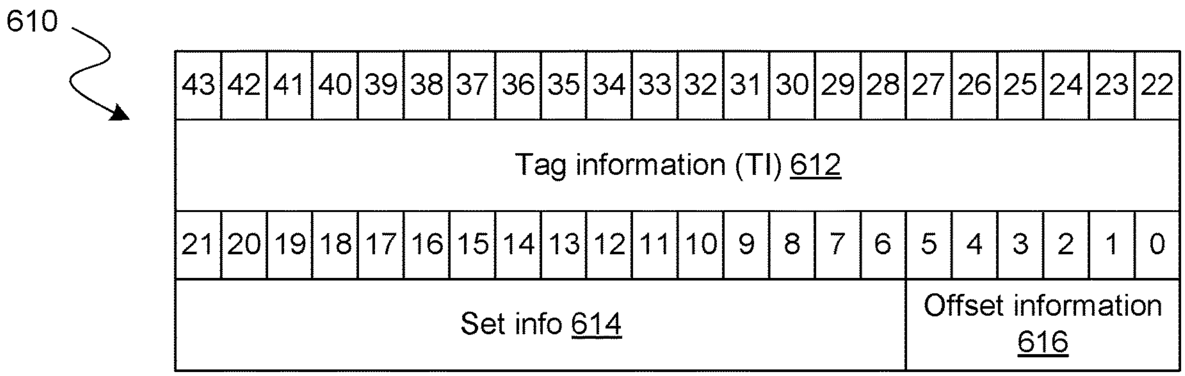
Figure 6C:
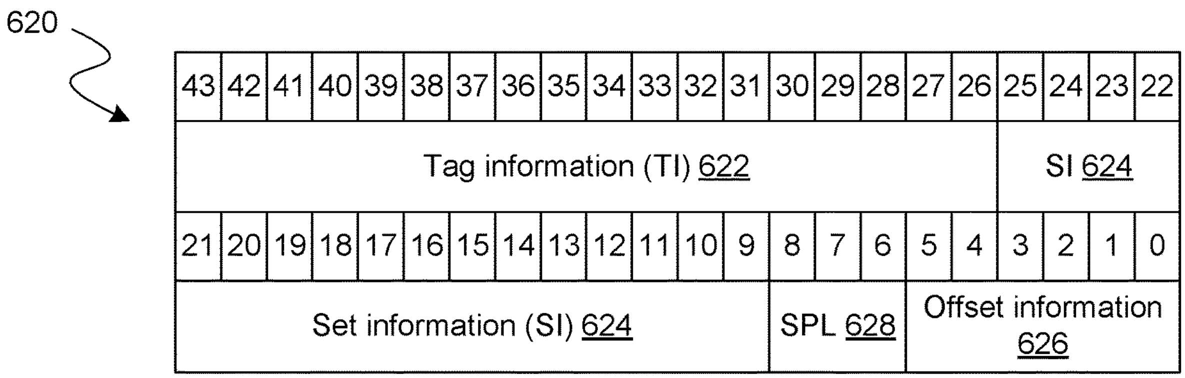

FIGS. 6A, 6B, 6C shows respective formats 600, 610, 620 of addressing information which an IC die variously uses to access a tag (and state) array and/or a cache array according to an embodiment. In various embodiments, an IC die is (re)configurable to implement any of multiple operational modes—e.g., wherein some or all such modes each correspond to a different respective one of formats 600, 610, 620. For example, one of IC dies 100, 301 is operable to cache data, or retrieved cache data, based on address information which—according to a current operational mode of the IC die—has one of formats 600, 610, 620.

As shown in FIG. 6A, format 600 includes a 25-bit tag information (TI) field 602, a 13-bit set information (SI) field 604, and a 6-bit offset information field 606. In one example embodiment, address information is provided according to format 600 for use by cache controller 340 during the first operational mode which is illustrated in the description of system 300.

By contrast, as shown in FIG. 6B, format 610 includes a 22-bit tag information (TI) field 612, a 16-bit set information (SI) field 614, and a 6-bit offset information field 616. In an embodiment, address information is provided according to format 610 for use by cache controller 340 during the second operational mode which is illustrated in the description of system 400.

By contrast, as shown in FIG. 6C, format 620 includes a 18-bit tag information (TI) field 622, a 17-bit set information (SI) field 624, a 6-bit offset information field 626, and a 3-bit superline (SPL) field 628. The SPL field 628 includes a value which identifies a superline (if any) to which the addressed cache line belongs. In an embodiment, address information is provided according to format 620 for use by cache controller 340 during the third operational mode which is illustrated in the description of system 500.

Exemplary Computer Architectures.

Detailed below are describes of exemplary computer architectures. Other system designs and configurations known in the arts for laptop, desktop, and handheld personal computers (PC)s, personal digital assistants, engineering workstations, servers, disaggregated servers, network devices, network hubs, switches, routers, embedded processors, digital signal processors (DSPs), graphics devices, video game devices, set-top boxes, micro controllers, cell phones, portable media players, hand-held devices, and various other electronic devices, are also suitable. In general, a variety of systems or electronic devices capable of incorporating a processor and/or other execution logic as disclosed herein are generally suitable.

Figure 7:
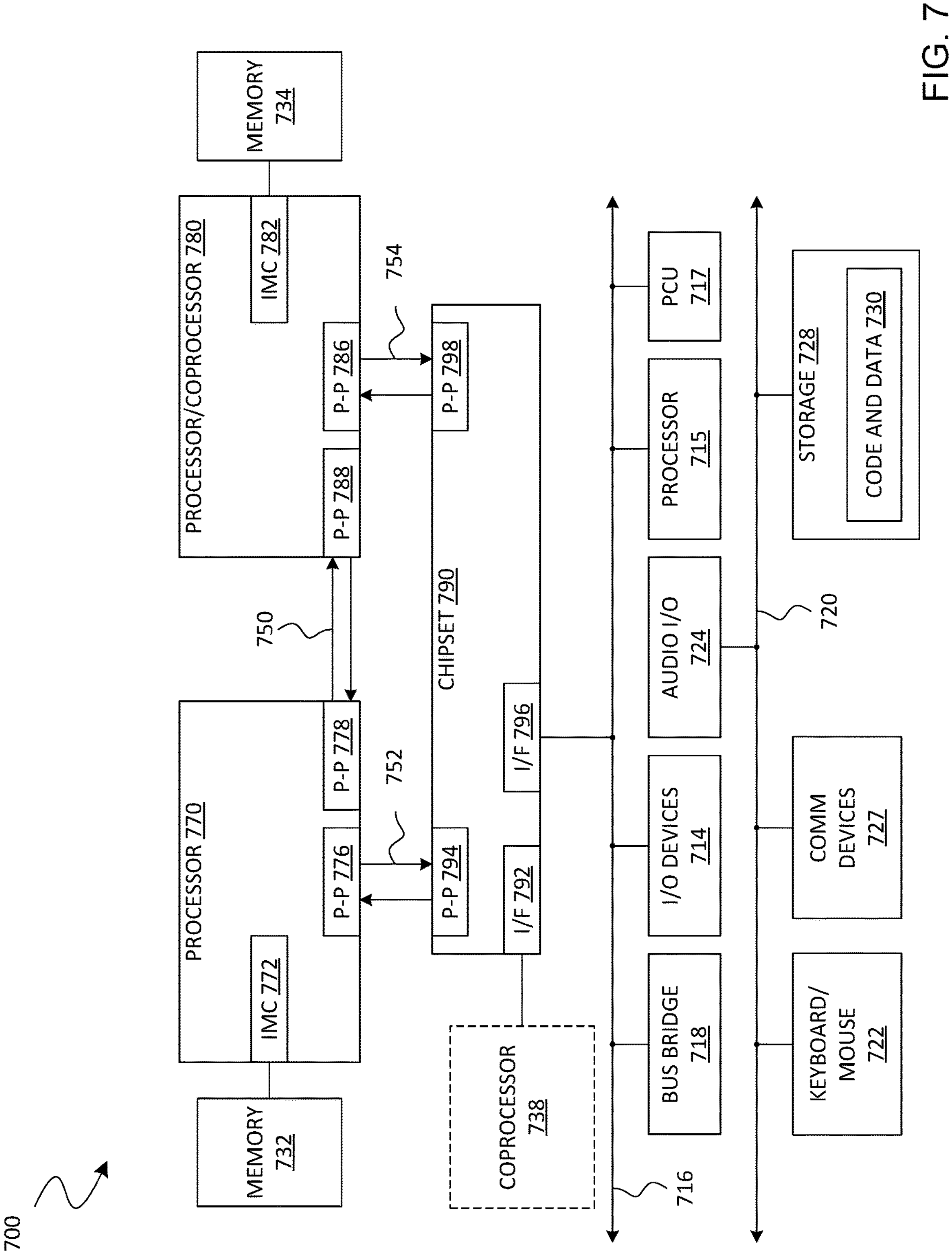
FIG. 7 illustrates an exemplary system.

FIG. 7 illustrates an exemplary system. Multiprocessor system 700 is a point-to-point interconnect system and includes a plurality of processors including a first processor 770 and a second processor 780 coupled via a point-to-point interconnect 750. In some examples, the first processor 770 and the second processor 780 are homogeneous. In some examples, first processor 770 and the second processor 780 are heterogenous. Though the exemplary system 700 is shown to have two processors, the system may have three or more processors, or may be a single processor system.

Processors 770 and 780 are shown including integrated memory controller (IMC) circuitry 772 and 782, respectively. Processor 770 also includes as part of its interconnect controller point-to-point (P-P) interfaces 776 and 778; similarly, second processor 780 includes P-P interfaces 786 and 788. Processors 770, 780 may exchange information via the point-to-point (P-P) interconnect 750 using P-P interface circuits 778, 788. IMCs 772 and 782 couple the processors 770, 780 to respective memories, namely a memory 732 and a memory 734, which may be portions of main memory locally attached to the respective processors.

Processors 770, 780 may each exchange information with a chipset 790 via individual P-P interconnects 752, 754 using point to point interface circuits 776, 794, 786, 798. Chipset 790 may optionally exchange information with a coprocessor 738 via an interface 792. In some examples, the coprocessor 738 is a special-purpose processor, such as, for example, a high-throughput processor, a network or communication processor, compression engine, graphics processor, general purpose graphics processing unit (GPGPU), neural-network processing unit (NPU), embedded processor, or the like.

A shared cache (not shown) may be included in either processor 770, 780 or outside of both processors, yet connected with the processors via P-P interconnect, such that either or both processors' local cache information may be stored in the shared cache if a processor is placed into a low power mode.

Chipset 790 may be coupled to a first interconnect 716 via an interface 796. In some examples, first interconnect 716 may be a Peripheral Component Interconnect (PCI) interconnect, or an interconnect such as a PCI Express interconnect or another I/O interconnect. In some examples, one of the interconnects couples to a power control unit (PCU) 717, which may include circuitry, software, and/or firmware to perform power management operations with regard to the processors 770, 780 and/or co-processor 738. PCU 717 provides control information to a voltage regulator (not shown) to cause the voltage regulator to generate the appropriate regulated voltage. PCU 717 also provides control information to control the operating voltage generated. In various examples, PCU 717 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 717 is illustrated as being present as logic separate from the processor 770 and/or processor 780. In other cases, PCU 717 may execute on a given one or more of cores (not shown) of processor 770 or 780. In some cases, PCU 717 may be implemented as a microcontroller (dedicated or general-purpose) or other control logic configured to execute its own dedicated power management code, sometimes referred to as P-code. In yet other examples, power management operations to be performed by PCU 717 may be implemented externally to a processor, such as by way of a separate power management integrated circuit (PMIC) or another component external to the processor. In yet other examples, power management operations to be performed by PCU 717 may be implemented within BIOS or other system software.

Various I/O devices 714 may be coupled to first interconnect 716, along with a bus bridge 718 which couples first interconnect 716 to a second interconnect 720. In some examples, one or more additional processor(s) 715, such as coprocessors, high-throughput many integrated core (MIC) processors, GPGPUs, accelerators (such as graphics accelerators or digital signal processing (DSP) units), field programmable gate arrays (FPGAs), or any other processor, are coupled to first interconnect 716. In some examples, second interconnect 720 may be a low pin count (LPC) interconnect. Various devices may be coupled to second interconnect 720 including, for example, a keyboard and/or mouse 722, communication devices 727 and a storage circuitry 728. Storage circuitry 728 may be one or more non-transitory machine-readable storage media as described below, such as a disk drive or other mass storage device which may include instructions/code and data 730 in some examples. Further, an audio I/O 724 may be coupled to second interconnect 720. Note that other architectures than the point-to-point architecture described above are possible. For example, instead of the point-to-point architecture, a system such as multiprocessor system 700 may implement a multi-drop interconnect or other such architecture.

Exemplary Core Architectures, Processors, and Computer Architectures.

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput) computing. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip (SoC) that may include on the same die as the described CPU (sometimes referred to as the application core(s) or application processor(s)), the above described coprocessor, and additional functionality. Exemplary core architectures are described next, followed by descriptions of exemplary processors and computer architectures.

Figure 8:
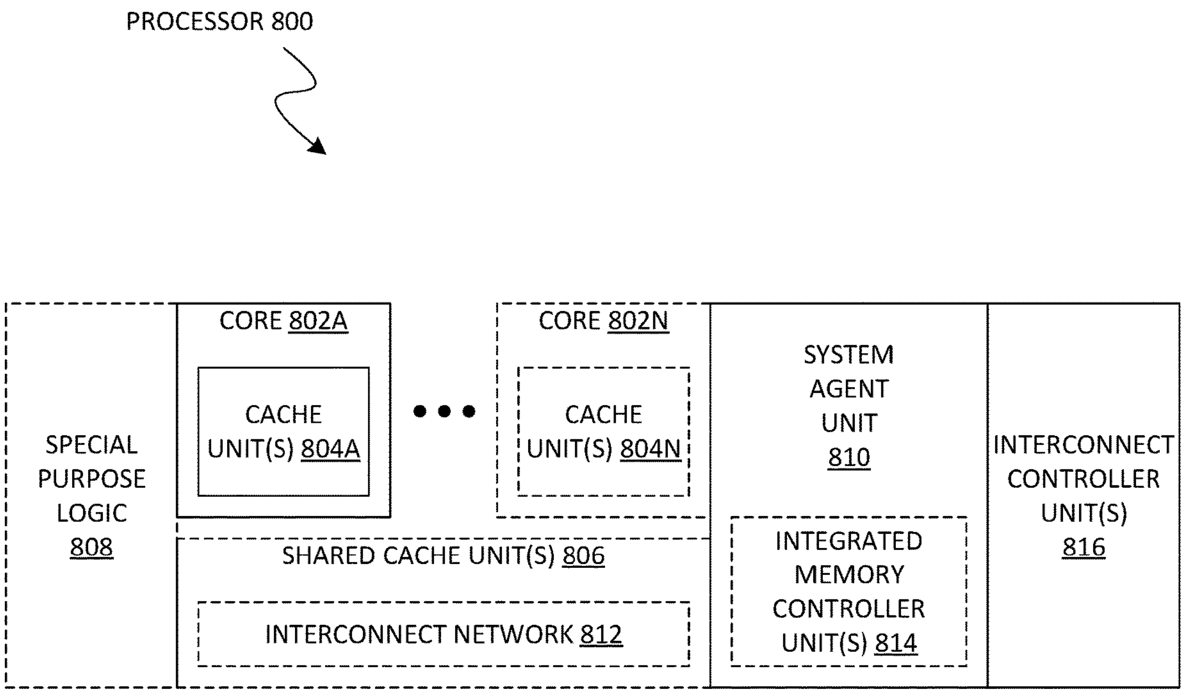
FIG. 8 illustrates a block diagram of an example processor that may have more than one core and an integrated memory controller.

FIG. 8 illustrates a block diagram of an example processor 800 that may have more than one core and an integrated memory controller. The solid lined boxes illustrate a processor 800 with a single core 802A, a system agent unit circuitry 810, a set of one or more interconnect controller unit(s) circuitry 816, while the optional addition of the dashed lined boxes illustrates an alternative processor 800 with multiple cores 802A-N, a set of one or more integrated memory controller unit(s) circuitry 814 in the system agent unit circuitry 810, and special purpose logic 808, as well as a set of one or more interconnect controller units circuitry 816. Note that the processor 800 may be one of the processors 770 or 780, or co-processor 738 or 715 of FIG. 7.

Thus, different implementations of the processor 800 may include: 1) a CPU with the special purpose logic 808 being integrated graphics and/or scientific (throughput) logic (which may include one or more cores, not shown), and the cores 802A-N being one or more general purpose cores (e.g., general purpose in-order cores, general purpose out-of-order cores, or a combination of the two); 2) a coprocessor with the cores 802A-N being a large number of special purpose cores intended primarily for graphics and/or scientific (throughput); and 3) a coprocessor with the cores 802A-N being a large number of general purpose in-order cores. Thus, the processor 800 may be a general-purpose processor, coprocessor or special-purpose processor, such as, for example, a network or communication processor, compression engine, graphics processor, GPGPU (general purpose graphics processing unit circuitry), a high-throughput many integrated core (MIC) coprocessor (including 30 or more cores), embedded processor, or the like. The processor may be implemented on one or more chips. The processor 800 may be a part of and/or may be implemented on one or more substrates using any of a number of process technologies, such as, for example, complementary metal oxide semiconductor (CMOS), bipolar CMOS (BiCMOS), P-type metal oxide semiconductor (PMOS), or N-type metal oxide semiconductor (NMOS).

A memory hierarchy includes one or more levels of cache unit(s) circuitry 804A-N within the cores 802A-N, a set of one or more shared cache unit(s) circuitry 806, and external memory (not shown) coupled to the set of integrated memory controller unit(s) circuitry 814. The set of one or more shared cache unit(s) circuitry 806 may include one or more mid-level caches, such as level 2 (L2), level 3 (L3), level 4 (L4), or other levels of cache, such as a last level cache (LLC), and/or combinations thereof. While in some examples ring-based interconnect network circuitry 812 interconnects the special purpose logic 808 (e.g., integrated graphics logic), the set of shared cache unit(s) circuitry 806, and the system agent unit circuitry 810, alternative examples use any number of well-known techniques for interconnecting such units. In some examples, coherency is maintained between one or more of the shared cache unit(s) circuitry 806 and cores 802A-N.

In some examples, one or more of the cores 802A-N are capable of multi-threading. The system agent unit circuitry 810 includes those components coordinating and operating cores 802A-N. The system agent unit circuitry 810 may include, for example, power control unit (PCU) circuitry and/or display unit circuitry (not shown). The PCU may be or may include logic and components needed for regulating the power state of the cores 802A-N and/or the special purpose logic 808 (e.g., integrated graphics logic). The display unit circuitry is for driving one or more externally connected displays.

The cores 802A-N may be homogenous in terms of instruction set architecture (ISA). Alternatively, the cores 802A-N may be heterogeneous in terms of ISA; that is, a subset of the cores 802A-N may be capable of executing an ISA, while other cores may be capable of executing only a subset of that ISA or another ISA.

Exemplary Core Architectures—In-Order and Out-of-Order Core Block Diagram.

FIG. 9A is a block diagram illustrating both an exemplary in-order pipeline and an exemplary register renaming, out-of-order issue/execution pipeline according to examples. FIG. 9B is a block diagram illustrating both an exemplary example of an in-order architecture core and an exemplary register renaming, out-of-order issue/execution architecture core to be included in a processor according to examples. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, an optional length decoding stage 904, a decode stage 906, an optional allocation (Alloc) stage 908, an optional renaming stage 910, a schedule (also known as a dispatch or issue) stage 912, an optional register read/memory read stage 914, an execute stage 916, a write back/memory write stage 918, an optional exception handling stage 922, and an optional commit stage 924. One or more operations can be performed in each of these processor pipeline stages. For example, during the fetch stage 902, one or more instructions are fetched from instruction memory, and during the decode stage 906, the one or more fetched instructions may be decoded, addresses (e.g., load store unit (LSU) addresses) using forwarded register ports may be generated, and branch forwarding (e.g., immediate offset or a link register (LR)) may be performed. In one example, the decode stage 906 and the register read/memory read stage 914 may be combined into one pipeline stage. In one example, during the execute stage 916, the decoded instructions may be executed, LSU address/data pipelining to an Advanced Microcontroller Bus (AMB) interface may be performed, multiply and add operations may be performed, arithmetic operations with branch results may be performed, etc.

By way of example, the exemplary register renaming, out-of-order issue/execution architecture core of FIG. 9B may implement the pipeline 900 as follows: 1) the instruction fetch circuitry 938 performs the fetch and length decoding stages 902 and 904; 2) the decode circuitry 940 performs the decode stage 906; 3) the rename/allocator unit circuitry 952 performs the allocation stage 908 and renaming stage 910; 4) the scheduler(s) circuitry 956 performs the schedule stage 912; 5) the physical register file(s) circuitry 958 and the memory unit circuitry 970 perform the register read/memory read stage 914; the execution cluster(s) 960 perform the execute stage 916; 6) the memory unit circuitry 970 and the physical register file(s) circuitry 958 perform the write back/memory write stage 918; 7) various circuitry may be involved in the exception handling stage 922; and 8) the retirement unit circuitry 954 and the physical register file(s) circuitry 958 perform the commit stage 924.

FIG. 9B shows a processor core 990 including front-end unit circuitry 930 coupled to an execution engine unit circuitry 950, and both are coupled to a memory unit circuitry 970. The core 990 may be a reduced instruction set architecture computing (RISC) core, a complex instruction set architecture computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit circuitry 930 may include branch prediction circuitry 932 coupled to an instruction cache circuitry 934, which is coupled to an instruction translation lookaside buffer (TLB) 936, which is coupled to instruction fetch circuitry 938, which is coupled to decode circuitry 940. In one example, the instruction cache circuitry 934 is included in the memory unit circuitry 970 rather than the front-end circuitry 930. The decode circuitry 940 (or decoder) may decode instructions, and generate as an output one or more micro-operations, micro-code entry points, microinstructions, other instructions, or other control signals, which are decoded from, or which otherwise reflect, or are derived from, the original instructions. The decode circuitry 940 may further include an address generation unit (AGU, not shown) circuitry. In one example, the AGU generates an LSU address using forwarded register ports, and may further perform branch forwarding (e.g., immediate offset branch forwarding, LR register branch forwarding, etc.). The decode circuitry 940 may be implemented using various different mechanisms. Examples of suitable mechanisms include, but are not limited to, look-up tables, hardware implementations, programmable logic arrays (PLAs), microcode read only memories (ROMs), etc. In one example, the core 990 includes a microcode ROM (not shown) or other medium that stores microcode for certain macroinstructions (e.g., in decode circuitry 940 or otherwise within the front end circuitry 930). In one example, the decode circuitry 940 includes a micro-operation (micro-op) or operation cache (not shown) to hold/cache decoded operations, micro-tags, or micro-operations generated during the decode or other stages of the processor pipeline 900. The decode circuitry 940 may be coupled to rename/allocator unit circuitry 952 in the execution engine circuitry 950.

The execution engine circuitry 950 includes the rename/allocator unit circuitry 952 coupled to a retirement unit circuitry 954 and a set of one or more scheduler(s) circuitry 956. The scheduler(s) circuitry 956 represents any number of different schedulers, including reservations stations, central instruction window, etc. In some examples, the scheduler(s) circuitry 956 can include arithmetic logic unit (ALU) scheduler/scheduling circuitry, ALU queues, arithmetic generation unit (AGU) scheduler/scheduling circuitry, AGU queues, etc. The scheduler(s) circuitry 956 is coupled to the physical register file(s) circuitry 958. Each of the physical register file(s) circuitry 958 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one example, the physical register file(s) circuitry 958 includes vector registers unit circuitry, writemask registers unit circuitry, and scalar register unit circuitry. These register units may provide architectural vector registers, vector mask registers, general-purpose registers, etc. The physical register file(s) circuitry 958 is coupled to the retirement unit circuitry 954 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 954 and the physical register file(s) circuitry 958 are coupled to the execution cluster(s) 960. The execution cluster(s) 960 includes a set of one or more execution unit(s) circuitry 962 and a set of one or more memory access circuitry 964. The execution unit(s) circuitry 962 may perform various arithmetic, logic, floating-point or other types of operations (e.g., shifts, addition, subtraction, multiplication) and on various types of data (e.g., scalar integer, scalar floating-point, packed integer, packed floating-point, vector integer, vector floating-point). While some examples may include a number of execution units or execution unit circuitry dedicated to specific functions or sets of functions, other examples may include only one execution unit circuitry or multiple execution units/execution unit circuitry that all perform all functions. The scheduler(s) circuitry 956, physical register file(s) circuitry 958, and execution cluster(s) 960 are shown as being possibly plural because certain examples create separate pipelines for certain types of data/operations (e.g., a scalar integer pipeline, a scalar floating-point/packed integer/ packed floating-point/vector integer/vector floating-point pipeline, and/or a memory access pipeline that each have their own scheduler circuitry, physical register file(s) circuitry, and/or execution cluster—and in the case of a separate memory access pipeline, certain examples are implemented in which only the execution cluster of this pipeline has the memory access unit(s) circuitry 964). It should also be understood that where separate pipelines are used, one or more of these pipelines may be out-of-order issue/execution and the rest in-order.

In some examples, the execution engine unit circuitry 950 may perform load store unit (LSU) address/data pipelining to an Advanced Microcontroller Bus (AMB) interface (not shown), and address phase and writeback, data phase load, store, and branches.

The set of memory access circuitry 964 is coupled to the memory unit circuitry 970, which includes data TLB circuitry 972 coupled to a data cache circuitry 974 coupled to a level 2 (L2) cache circuitry 976. In one exemplary example, the memory access circuitry 964 may include a load unit circuitry, a store address unit circuit, and a store data unit circuitry, each of which is coupled to the data TLB circuitry 972 in the memory unit circuitry 970. The instruction cache circuitry 934 is further coupled to the level 2 (L2) cache circuitry 976 in the memory unit circuitry 970. In one example, the instruction cache 934 and the data cache 974 are combined into a single instruction and data cache (not shown) in L2 cache circuitry 976, a level 3 (L3) cache circuitry (not shown), and/or main memory. The L2 cache circuitry 976 is coupled to one or more other levels of cache and eventually to a main memory.

The core 990 may support one or more instructions sets (e.g., the x86 instruction set architecture (optionally with some extensions that have been added with newer versions); the MIPS instruction set architecture; the ARM instruction set architecture (optionally with optional additional extensions such as NEON)), including the instruction(s) described herein. In one example, the core 990 includes logic to support a packed data instruction set architecture extension (e.g., AVX1, AVX2), thereby allowing the operations used by many multimedia applications to be performed using packed data.

Exemplary Execution Unit(s) Circuitry.

Figure 10:
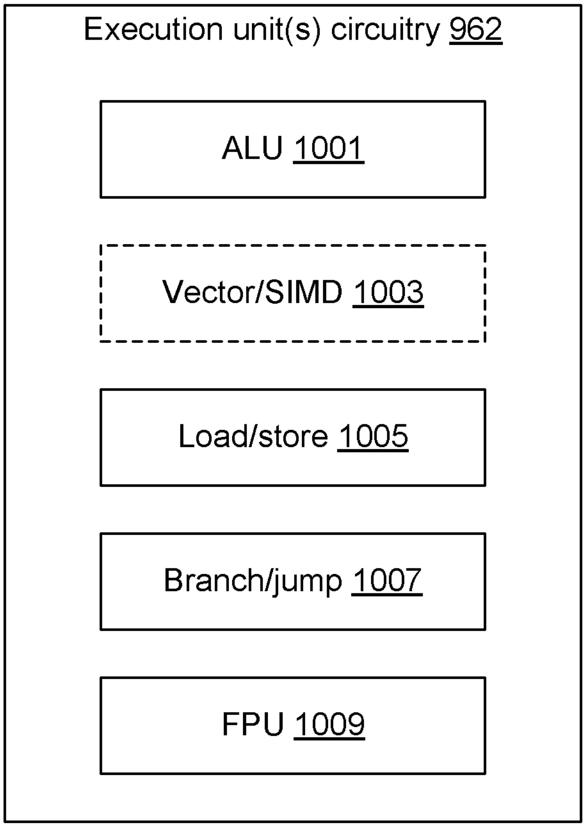
FIG. 10 illustrates examples of execution unit(s) circuitry.

FIG. 10 illustrates examples of execution unit(s) circuitry, such as execution unit(s) circuitry 962 of FIG. 9B. As illustrated, execution unit(s) circuitry 962 may include one or more ALU circuits 1001, optional vector/single instruction multiple data (SIMD) circuits 1003, load/store circuits 1005, branch/jump circuits 1007, and/or Floating-point unit (FPU) circuits 1009. ALU circuits 1001 perform integer arithmetic and/or Boolean operations. Vector/SIMD circuits 1003 perform vector/SIMD operations on packed data (such as SIMD/vector registers). Load/store circuits 1005 execute load and store instructions to load data from memory into registers or store from registers to memory. Load/store circuits 1005 may also generate addresses. Branch/jump circuits 1007 cause a branch or jump to a memory address depending on the instruction. FPU circuits 1009 perform floating-point arithmetic. The width of the execution unit(s) circuitry 962 varies depending upon the example and can range from 16-bit to 1,024-bit, for example. In some examples, two or more smaller execution units are logically combined to form a larger execution unit (e.g., two 128-bit execution units are logically combined to form a 256-bit execution unit).

Exemplary Register Architecture

Figure 11:
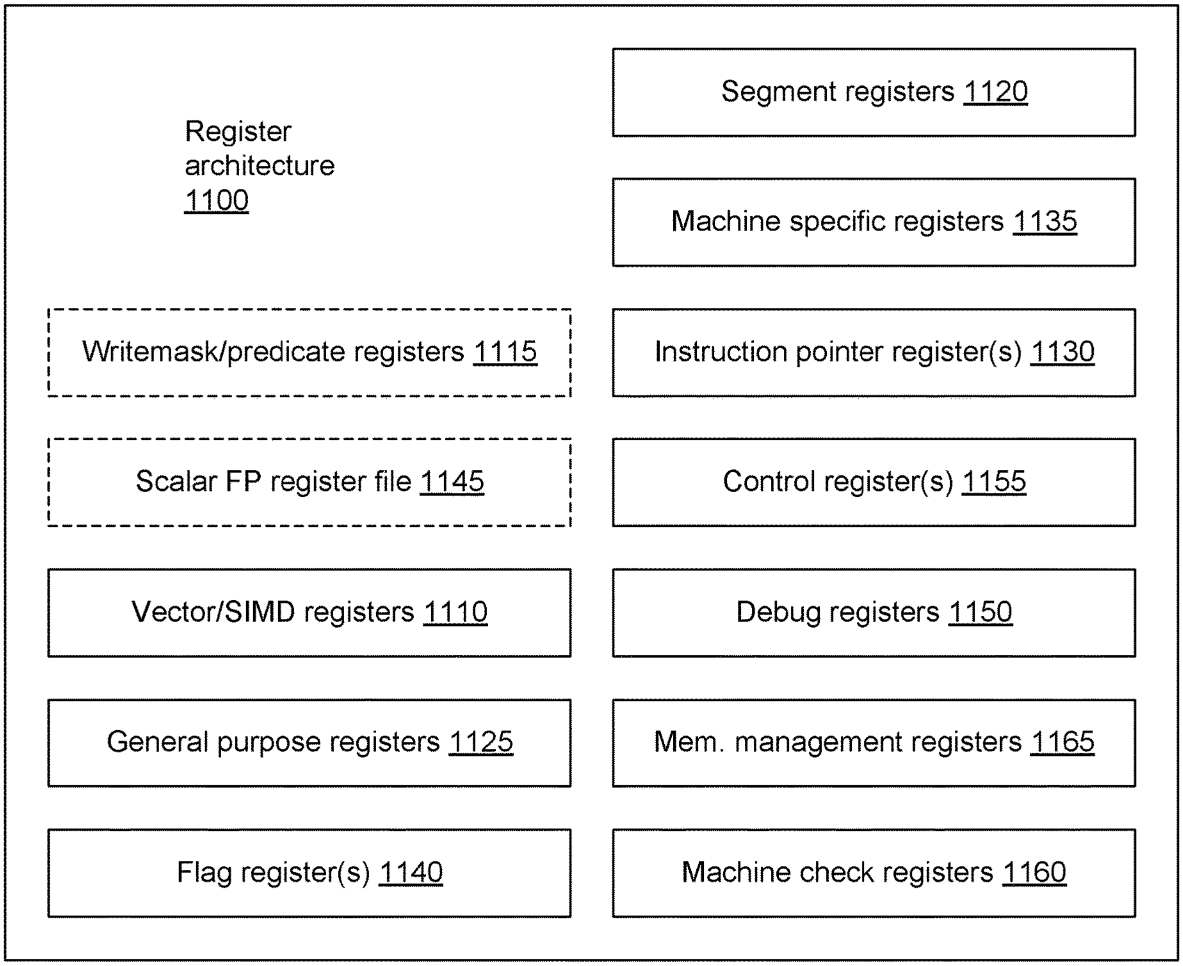
FIG. 11 is a block diagram of a register architecture according to some examples.

FIG. 11 is a block diagram of a register architecture 1100 according to some examples. As illustrated, the register architecture 1100 includes vector/SIMD registers 1110 that vary from 128-bit to 1,024 bits width. In some examples, the vector/SIMD registers 1110 are physically 512-bits and, depending upon the mapping, only some of the lower bits are used. For example, in some examples, the vector/SIMD registers 1110 are ZMM registers which are 512 bits: the lower 256 bits are used for YMM registers and the lower 128 bits are used for XMM registers. As such, there is an overlay of registers. In some examples, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the example.

In some examples, the register architecture 1100 includes writemask/predicate registers 1115. For example, in some examples, there are 8 writemask/predicate registers (sometimes called k0 through k7) that are each 16-bit, 32-bit, 64-bit, or 128-bit in size. Writemask/predicate registers 1115 may allow for merging (e.g., allowing any set of elements in the destination to be protected from updates during the execution of any operation) and/or zeroing (e.g., zeroing vector masks allow any set of elements in the destination to be zeroed during the execution of any operation). In some examples, each data element position in a given writemask/predicate register 1115 corresponds to a data element position of the destination. In other examples, the writemask/predicate registers 1115 are scalable and consists of a set number of enable bits for a given vector element (e.g., 8 enable bits per 64-bit vector element).

The register architecture 1100 includes a plurality of general-purpose registers 1125. These registers may be 16-bit, 32-bit, 64-bit, etc. and can be used for scalar operations. In some examples, these registers are referenced by the names RAX, RBX, RCX, RDX, RBP, RSI, RDI, RSP, and R8 through R15.

In some examples, the register architecture 1100 includes scalar floating-point (FP) register 1145 which is used for scalar floating-point operations on 32/64/80-bit floating-point data using the x87 instruction set architecture extension or as MMX registers to perform operations on 64-bit packed integer data, as well as to hold operands for some operations performed between the MMX and XMM registers.

One or more flag registers 1140 (e.g., EFLAGS, RFLAGS, etc.) store status and control information for arithmetic, compare, and system operations. For example, the one or more flag registers 1140 may store condition code information such as carry, parity, auxiliary carry, zero, sign, and overflow. In some examples, the one or more flag registers 1140 are called program status and control registers.

Segment registers 1120 contain segment points for use in accessing memory. In some examples, these registers are referenced by the names CS, DS, SS, ES, FS, and GS.

Machine specific registers (MSRs) 1135 control and report on processor performance. Most MSRs 1135 handle system-related functions and are not accessible to an application program. Machine check registers 1160 consist of control, status, and error reporting MSRs that are used to detect and report on hardware errors.

One or more instruction pointer register(s) 1130 store an instruction pointer value. Control register(s) 1155 (e.g., CR0-CR4) determine the operating mode of a processor (e.g., processor 770, 780, 738, 715, and/or 800) and the characteristics of a currently executing task. Debug registers 1150 control and allow for the monitoring of a processor or core's debugging operations.

Memory (mem) management registers 1165 specify the locations of data structures used in protected mode memory management. These registers may include a GDTR, IDRT, task register, and a LDTR register.

Alternative examples may use wider or narrower registers. Additionally, alternative examples may use more, less, or different register files and registers. The register architecture 1100 may, for example, be used in physical register file(s) circuitry 958.

In one or more first embodiments, an apparatus comprises a first memory cell array and a second memory cell array, a cache controller, detector circuitry to detect a connectivity condition of the apparatus, comprising the detector circuitry to determine whether the apparatus is coupled to an external device which comprises a third memory cell array that is to provide a cache array functionality, selector circuitry to perform a selection, based on the connectivity condition, which selects one mode from among multiple modes of the cache controller, wherein the multiple modes comprise a first mode which is to provide a tag array functionality with the first memory cell array, and which is further to provide the cache array functionality with the second memory cell array, and a second mode which is to provide the tag array functionality with the second memory cell array, wherein, based on the selection, the selector circuitry is to signal the cache controller to transition to the one mode.

In one or more second embodiments, further to the first embodiment, the second mode is further to provide the cache array functionality with the third memory cell array.

In one or more third embodiments, further to the first embodiment or the second embodiment, the first mode is further to provide a state array functionality with the first memory cell array, and wherein the second mode is further to provide a state array functionality with the second memory cell array.

In one or more fourth embodiments, further to any of the first through third embodiments, the second mode is further to disable a provisioning of the tag array functionality with the first memory cell array, and is further to disable a provisioning of the cache array functionality with the first memory cell array.

In one or more fifth embodiments, further to the fourth embodiment, the multiple modes further comprise a third mode which is to provide the tag array functionality with each of the first memory cell array and the second memory cell array, and which is further to provide the cache array functionality with the third memory cell array.

In one or more sixth embodiments, further to the fifth embodiment, the detector circuitry to detect the connectivity condition comprises the detector circuitry to detect a presence of the external device, and wherein one of the second mode or the third mode is selected based on a size of the third memory cell array.

In one or more seventh embodiments, further to the fifth embodiment, the third mode enables first circuitry of the cache controller to detect a hit or a miss of a superline of a cache array, and wherein the first mode disables the first circuitry.

In one or more eighth embodiments, further to any of the first through third embodiments, the multiple modes each correspond to a different respective format for address information with which the cache controller is to access a tag array or a cache array.

In one or more ninth embodiments, further to any of the first through third embodiments, the detector circuitry to detect the connectivity condition comprises the detector circuitry to detect an absence of the external device, and wherein the first mode is selected based on the connectivity condition.

In one or more tenth embodiments, further to any of the first through third embodiments, the detector circuitry is further to detect a change to one of a performance requirement of the apparatus, or a characteristic of power consumption with the apparatus, and wherein, based on the change, the selector circuitry is further to select another mode of the cache controller from among the multiple modes, and signal the cache controller to transition to the other mode.

In one or more eleventh embodiments, further to any of the first through third embodiments, the apparatus is an integrated circuit (IC) die.

In one or more twelfth embodiments, further to the eleventh embodiment, the external device is another IC die.

In one or more thirteenth embodiments, a non-transitory computer-readable storage media which, when executed by a processor, causes the processor to perform a method comprises detecting a connectivity condition of an apparatus which comprises a first memory cell array and a second memory cell array, comprising determining whether the apparatus is coupled to an external device which comprises a third memory cell array that is to provide a cache array functionality, based on the connectivity condition, performing a selection of one mode from among multiple modes of a cache controller of the apparatus, wherein the multiple modes comprise a first mode which is to provide a tag array functionality with the first memory cell array, and which is further to provide the cache array functionality with the second memory cell array, and a second mode which is to provide the tag array functionality with the second memory cell array, and which is further to provide the cache array functionality with the third memory cell array, based on the selection, transitioning the cache controller to the one mode, and based on the one mode, operating one of the first memory cell array or the second memory cell array as a tag array.

In one or more fourteenth embodiments, further to the thirteenth embodiment, the first mode is further to provide a state array functionality with the first memory cell array, and wherein the second mode is further to provide a state array functionality with the second memory cell array.

In one or more fifteenth embodiments, further to the thirteenth embodiment or the fourteenth embodiment, the second mode is further to disable a provisioning of the tag array functionality with the first memory cell array, and is further to disable a provisioning of the cache array functionality with the first memory cell array.

In one or more sixteenth embodiments, further to the fifteenth embodiment, the multiple modes further comprise a third mode which is to provide the tag array functionality with each of the first memory cell array and the second memory cell array, and which is further to provide the cache array functionality with the third memory cell array.

In one or more seventeenth embodiments, further to the sixteenth embodiment, detecting the connectivity condition comprises detecting a presence of the external device, and wherein one of the second mode or the third mode is selected based on a size of the third memory cell array.

In one or more eighteenth embodiments, further to the sixteenth embodiment, the third mode enables first circuitry of the cache controller to detect a hit or a miss of a superline of a cache array, and wherein the first mode disables the first circuitry.

In one or more nineteenth embodiments, further to the thirteenth embodiment or the fourteenth embodiment, the multiple modes each correspond to a different respective format for address information with which the cache controller is to access a tag array or a cache array.

In one or more twentieth embodiments, further to the thirteenth embodiment or the fourteenth embodiment, detecting the connectivity condition comprises detecting an absence of the external device, and wherein the first mode is selected based on the connectivity condition.

In one or more twenty-first embodiments, further to the thirteenth embodiment or the fourteenth embodiment, the method further comprises detecting a change to one of a performance requirement of the apparatus, or a characteristic of power consumption with the apparatus, and based on the change selecting another mode of the cache controller from among the multiple modes, and transitioning the cache controller to the other mode.

In one or more twenty-second embodiments, further to the thirteenth embodiment or the fourteenth embodiment, the apparatus is an integrated circuit (IC) die.

In one or more twenty-third embodiments, further to the twenty-second embodiment, the external device is another IC die.

In one or more twenty-fourth embodiments, a system comprises an apparatus comprising a processor core, a first memory cell array and a second memory cell array, a cache controller, detector circuitry to detect a connectivity condition of the apparatus, comprising the detector circuitry to determine whether the apparatus is coupled to an external device which comprises a third memory cell array that is to provide a cache array functionality, selector circuitry to perform a selection, based on the connectivity condition, which selects one mode from among multiple modes of the cache controller, wherein the multiple modes comprise a first mode which is to provide a tag array functionality with the first memory cell array, and which is further to provide the cache array functionality with the second memory cell array, and a second mode which is to provide the tag array functionality with the second memory cell array, wherein, based on the selection, the selector circuitry is to signal the cache controller to transition to the one mode, and a display device coupled to the apparatus, the display device to display an image based on a signal communicated with the processor core.

In one or more twenty-fifth embodiments, further to the twenty-fourth embodiment, the second mode is further to provide the cache array functionality with the third memory cell array.

In one or more twenty-sixth embodiments, further to the twenty-fourth embodiment or the twenty-fifth embodiment, the first mode is further to provide a state array functionality with the first memory cell array, and wherein the second mode is further to provide a state array functionality with the second memory cell array.

In one or more twenty-seventh embodiments, further to any of the twenty-fourth through twenty-sixth embodiments, the second mode is further to disable a provisioning of the tag array functionality with the first memory cell array, and is further to disable a provisioning of the cache array functionality with the first memory cell array.

In one or more twenty-eighth embodiments, further to the twenty-seventh embodiment, the multiple modes further comprise a third mode which is to provide the tag array functionality with each of the first memory cell array and the second memory cell array, and which is further to provide the cache array functionality with the third memory cell array.

In one or more twenty-ninth embodiments, further to the twenty-eighth embodiment, the detector circuitry to detect the connectivity condition comprises the detector circuitry to detect a presence of the external device, and wherein one of the second mode or the third mode is selected based on a size of the third memory cell array.

In one or more thirtieth embodiments, further to the twenty-eighth embodiment, the third mode enables first circuitry of the cache controller to detect a hit or a miss of a superline of a cache array, and wherein the first mode disables the first circuitry.

In one or more thirty-first embodiments, further to any of the twenty-fourth through twenty-sixth embodiments, the multiple modes each correspond to a different respective format for address information with which the cache controller is to access a tag array or a cache array.

In one or more thirty-second embodiments, further to any of the twenty-fourth through twenty-sixth embodiments, the detector circuitry to detect the connectivity condition comprises the detector circuitry to detect an absence of the external device, and wherein the first mode is selected based on the connectivity condition.

In one or more thirty-third embodiments, further to any of the twenty-fourth through twenty-sixth embodiments, the detector circuitry is further to detect a change to one of a performance requirement of the apparatus, or a characteristic of power consumption with the apparatus, and wherein, based on the change, the selector circuitry is further to select another mode of the cache controller from among the multiple modes, and signal the cache controller to transition to the other mode.

In one or more thirty-fourth embodiments, further to any of the twenty-fourth through twenty-sixth embodiments, the apparatus is an integrated circuit (IC) die.

In one or more thirty-fifth embodiments, further to the thirty-fourth embodiment, the external device is another IC die.

Numerous details are set forth herein to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left." "right." "front." "back," "top," "bottom," "over," "under." and the like in the description and in the claims, if any, are used for descriptive purposes and not necessarily for describing permanent relative positions. For example, the terms "over," "under," "front side." "back side," "top," "bottom." "over." "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

Techniques and architectures for providing functionality of an array are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. An apparatus comprising:

a first memory cell array and a second memory cell array;

a cache controller;

detector circuitry to detect a connectivity condition of the apparatus, comprising the detector circuitry to determine whether the apparatus is coupled to an external device which comprises a third memory cell array that is to provide a cache array functionality;

selector circuitry to perform a selection, based on the connectivity condition, which selects one mode from among multiple modes of the cache controller, wherein the multiple modes comprise:

a first mode which is to provide a tag array functionality with the first memory cell array, and which is further to provide the cache array functionality with the second memory cell array; and a second mode which is to provide the tag array functionality with the second memory cell array;

wherein, based on the selection, the selector circuitry is to signal the cache controller to transition to the one mode.

2. The apparatus of claim 1, wherein the second mode is further to provide the cache array functionality with the third memory cell array.

3. The apparatus of claim 1, wherein the first mode is further to provide a state array functionality with the first memory cell array, and wherein the second mode is further to provide a state array functionality with the second memory cell array.

4. The apparatus of claim 1, wherein the second mode is further to disable a provisioning of the tag array functionality with the first memory cell array, and is further to disable a provisioning of the cache array functionality with the first memory cell array.

5. The apparatus of claim 4, wherein the multiple modes further comprise a third mode which is to provide the tag array functionality with each of the first memory cell array and the second memory cell array, and which is further to provide the cache array functionality with the third memory cell array.

6. The apparatus of claim 5, wherein the detector circuitry to detect the connectivity condition comprises the detector circuitry to detect a presence of the external device, and wherein one of the second mode or the third mode is selected based on a size of the third memory cell array.

7. The apparatus of claim 5, wherein the third mode enables first circuitry of the cache controller to detect a hit or a miss of a superline of a cache array, and wherein the first mode disables the first circuitry.

8. The apparatus of claim 1, wherein the multiple modes each correspond to a different respective format for address information with which the cache controller is to access a tag array or a cache array.

9. The apparatus of claim 1, wherein the detector circuitry to detect the connectivity condition comprises the detector circuitry to detect an absence of the external device, and wherein the first mode is selected based on the connectivity condition.

10. The apparatus of claim 1, wherein the detector circuitry is further to detect a change to one of a performance requirement of the apparatus, or a characteristic of power consumption with the apparatus; and wherein, based on the change, the selector circuitry is further to:

select another mode of the cache controller from among the multiple modes; and signal the cache controller to transition to the other mode.

11. A non-transitory computer-readable storage media which, when executed by a processor, causes the processor to perform a method comprising:

detecting a connectivity condition of an apparatus which comprises a first memory cell array and a second memory cell array, comprising determining whether the apparatus is coupled to an external device which comprises a third memory cell array that is to provide a cache array functionality;

based on the connectivity condition, performing a selection of one mode from among multiple modes of a cache controller of the apparatus, wherein the multiple modes comprise:

a first mode which is to provide a tag array functionality with the first memory cell array, and which is further to provide the cache array functionality with the second memory cell array; and a second mode which is to provide the tag array functionality with the second memory cell array, and which is further to provide the cache array functionality with the third memory cell array;

based on the selection, transitioning the cache controller to the one mode; and based on the one mode, operating one of the first memory cell array or the second memory cell array as a tag array.

12. The non-transitory computer-readable storage media of claim 11, wherein the first mode is further to provide a state array functionality with the first memory cell array, and wherein the second mode is further to provide a state array functionality with the second memory cell array.

13. The non-transitory computer-readable storage media of claim 11, wherein the second mode is further to disable a provisioning of the tag array functionality with the first memory cell array, and is further to disable a provisioning of the cache array functionality with the first memory cell array.

14. The non-transitory computer-readable storage media of claim 11, wherein the multiple modes each correspond to a different respective format for address information with which the cache controller is to access a tag array or a cache array.

15. The non-transitory computer-readable storage media of claim 11, the method further comprising:

detecting a change to one of a performance requirement of the apparatus, or a characteristic of power consumption with the apparatus; and based on the change:

selecting another mode of the cache controller from among the multiple modes; and transitioning the cache controller to the other mode.

16. A system comprising:

an apparatus comprising:

a processor core;

a first memory cell array and a second memory cell array;

a cache controller;

detector circuitry to detect a connectivity condition of the apparatus, comprising the detector circuitry to determine whether the apparatus is coupled to an external device which comprises a third memory cell array that is to provide a cache array functionality;

selector circuitry to perform a selection, based on the connectivity condition, which selects one mode from among multiple modes of the cache controller, wherein the multiple modes comprise:

a first mode which is to provide a tag array functionality with the first memory cell array, and which is further to provide the cache array functionality with the second memory cell array; and a second mode which is to provide the tag array functionality with the second memory cell array;

wherein, based on the selection, the selector circuitry is to signal the cache controller to transition to the one mode; and a display device coupled to the apparatus, the display device to display an image based on a signal communicated with the processor core.

17. The system of claim 16, wherein the second mode is further to provide the cache array functionality with the third memory cell array.

18. The system of claim 16, wherein the first mode is further to provide a state array functionality with the first memory cell array, and wherein the second mode is further to provide a state array functionality with the second memory cell array.

19. The system of claim 16, wherein the multiple modes each correspond to a different respective format for address information with which the cache controller is to access a tag array or a cache array.

20. The system of claim 16, wherein the detector circuitry is further to detect a change to one of a performance requirement of the apparatus, or a characteristic of power consumption with the apparatus; and wherein, based on the change, the selector circuitry is further to:

select another mode of the cache controller from among the multiple modes; and signal the cache controller to transition to the other mode.

* * * * *